United States Patent
Yarvis et al.

(10) Patent No.: US 11,637,918 B2
(45) Date of Patent: Apr. 25, 2023

(54) SELF-DESCRIPTIVE ORCHESTRATABLE MODULES IN SOFTWARE-DEFINED INDUSTRIAL SYSTEMS

(71) Applicant: Intel Corporation, Santa Clara, CA (US)

(72) Inventors: Mark Yarvis, Portland, OR (US); Rita H. Wouhaybi, Portland, OR (US); Ron Kuruvilla Thomas, San Jose, CA (US); Casey Rathbone, Banks, OR (US); Aaron R. Berck, Hillsboro, OR (US); Sharad Garg, Portland, OR (US); Robert Chavez, Phoenix, AZ (US); Kirk Smith, Chandler, AZ (US); Mandeep Shetty, Chandler, AZ (US); Xubo Zhang, Fremont, CA (US); Ansuya Negi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 16/147,190

(22) Filed: Sep. 28, 2018

(65) Prior Publication Data
US 2019/0041830 A1 Feb. 7, 2019

Related U.S. Application Data

(60) Provisional application No. 62/612,092, filed on Dec. 29, 2017, provisional application No. 62/587,227, filed on Nov. 16, 2017.

(51) Int. Cl.
*G06F 8/65* (2018.01)
*G06F 11/20* (2006.01)
(Continued)

(52) U.S. Cl.
CPC ............ *H04L 69/40* (2013.01); *G05B 19/042* (2013.01); *G05B 19/054* (2013.01);
(Continued)

(58) Field of Classification Search
CPC .......... G06F 11/2023; G06F 2201/805; G06F 2201/82; H04L 67/12; H04L 67/24; H04L 67/34; G05B 19/02; G05B 19/042
See application file for complete search history.

(56) References Cited

U.S. PATENT DOCUMENTS

| 7,024,483 B2 | 4/2006 | Dinker et al. |
| 7,206,836 B2 | 4/2007 | Dinker et al. |

(Continued)

FOREIGN PATENT DOCUMENTS

| CN | 111164952 | 5/2020 |
| WO | WO-2018144059 A1 | 8/2018 |
| WO | WO-2019099111 A1 | 5/2019 |

OTHER PUBLICATIONS

"International Application No. PCT/US2018/053607, Invitation to Pay Additional fees dated Jan. 16, 2019", 15 pgs.
(Continued)

*Primary Examiner* — Wei Y Zhen
*Assistant Examiner* — Amir Soltanzadeh
(74) *Attorney, Agent, or Firm* — Schwegman Lundberg & Woessner, P.A.

(57) ABSTRACT

Various systems and methods are provided for implementing a software defined industrial system. In an example, self-descriptive control applications and software modules are provided in the context of orchestratable distributed systems. The self-descriptive control applications may be executed by an orchestrator or like control device, configured to: identify available software modules adapted to perform functional operations in a control system environ-
(Continued)

ment; identify operational characteristics that identify characteristics of execution of the available software modules that are available to implement a control system application; select a software module for execution based on the operational configuration and the operational characteristics identified in the manifest; and cause the execution of the selected software module in the control system environment based on an application specification for the control system application.

22 Claims, 24 Drawing Sheets

(51) Int. Cl.
    *H04L 67/565*     (2022.01)
    *H04L 41/0668*     (2022.01)
    *H04L 69/40*     (2022.01)
    *H04L 67/10*     (2022.01)
    *G05B 19/042*     (2006.01)
    *G05B 19/05*     (2006.01)
    *G05B 19/418*     (2006.01)
    *H04L 41/082*     (2022.01)
    *H04L 41/084*     (2022.01)
    *H04L 67/04*     (2022.01)
    *H04L 67/104*     (2022.01)
    *H04L 67/12*     (2022.01)
    *H04L 67/125*     (2022.01)
    *H04L 67/00*     (2022.01)

(52) U.S. Cl.
    CPC ......... *G05B 19/41835* (2013.01); *G06F 8/65* (2013.01); *G06F 11/2023* (2013.01); *G06F 11/2033* (2013.01); *H04L 41/0668* (2013.01); *H04L 41/082* (2013.01); *H04L 41/0846* (2013.01); *H04L 67/04* (2013.01); *H04L 67/10* (2013.01); *H04L 67/1048* (2013.01); *H04L 67/1051* (2013.01); *H04L 67/12* (2013.01); *H04L 67/125* (2013.01); *H04L 67/34* (2013.01); *H04L 67/565* (2022.05); *G05B 2219/1105* (2013.01); *G05B 2219/1214* (2013.01); *G05B 2219/32043* (2013.01); *G05B 2219/33112* (2013.01); *G06F 2201/805* (2013.01); *G06F 2201/82* (2013.01); *G06F 2201/85* (2013.01)

(56) References Cited

U.S. PATENT DOCUMENTS

| | | | |
|---|---|---|---|
| 7,852,754 B2 | 12/2010 | Khanna et al. | |
| 8,873,380 B2 | 10/2014 | Tochio | |
| 8,874,274 B2 | 10/2014 | Mcdonald et al. | |
| 9,065,810 B2 | 6/2015 | Nair et al. | |
| 9,075,769 B2 | 7/2015 | Tochio | |
| 9,774,658 B2 | 9/2017 | Borzycki et al. | |
| 10,739,761 B2 | 8/2020 | Chavez et al. | |
| 2008/0222621 A1* | 9/2008 | Knight | G06F 8/71 717/151 |
| 2010/0153736 A1 | 6/2010 | Kilian | |
| 2011/0289489 A1* | 11/2011 | Kumar | G06F 11/3664 717/135 |
| 2014/0146673 A1 | 5/2014 | Parker | |
| 2016/0065653 A1* | 3/2016 | Chen | H04L 67/10 715/735 |
| 2016/0337403 A1 | 11/2016 | Stoops et al. | |
| 2016/0357523 A1* | 12/2016 | Zhang | G06F 8/34 |
| 2017/0093587 A1 | 3/2017 | Glisson | |
| 2018/0084111 A1 | 3/2018 | Pirat et al. | |
| 2019/0041824 A1 | 2/2019 | Chavez et al. | |
| 2019/0042378 A1 | 2/2019 | Wouhaybi et al. | |

OTHER PUBLICATIONS

"International Application Serial No. PCT/US2018/053607, International Search Report dated Mar. 13, 2019", 6 pgs.
"International Application Serial No. PCT/US2018/053607, Written Opinion dated Mar. 13, 2019", 10 pgs.
U.S. Appl. No. 16/147,148, filed Sep. 28, 2018, Scalable Edge Compute in a Distributed Control Environment.
U.S. Appl. No. 16/147,168, filed Sep. 28, 2018, Distributed Dynamic Architecture for Error Correction.
"U.S. Appl. No. 16/147,148, Notice of Allowance dated Apr. 8, 2020", 11 pgs.
Hu, Yun Chao, et al., "Mobile Edge Computing A key technology towards 5G", ETSI White Paper No. 11, (Sep. 2015), 16 pgs.
"U.S. Appl. No. 16/147,168, Non Final Office Action dated Apr. 29, 2020", 15 pgs.
"U.S. Appl. No. 16/147,148, Corrected Notice of Allowability dated Jun. 10, 2020", 2 pgs.
"U.S. Appl. No. 16/147,168, Response filed Jul. 29, 2020 to Non Final Office Action dated Apr. 29, 2020", 8 pgs.
"U.S. Appl. No. 16/147,168, Notice of Allowance dated Aug. 11, 2020", 9 pgs.
"German Application Serial No. 112018005879.4, Office Action dated Jun. 26, 2020", W English Translation, 2 page.
"International Application Serial No. PCT US2018 053607, International Preliminary Report on Patentability dated May 28, 2020", 12 pgs.

\* cited by examiner

SELF-DESCRIPTIVE ORCHESTRATABLE MODULES IN SOFTWARE-DEFINED INDUSTRIAL SYSTEMS

PRIORITY CLAIM

This application claims the benefit of priority to U.S. Provisional Patent Application Ser. No. 62/587,227, filed Nov. 16, 2017 and titled "DISTRIBUTED SOFTWARE DEFINED INDUSTRIAL SYSTEMS", and 62/612,092, filed Dec. 29, 2017, and titled "DISTRIBUTED SOFTWARE DEFINED INDUSTRIAL SYSTEMS"; the above-identified provisional applications are incorporated herein by reference in their entirety.

TECHNICAL FIELD

Embodiments described herein generally relate to data processing and communications within distributed and interconnected device networks, and in particular, to techniques for defining operations of a software-defined industrial system (SDIS) provided from configurable Internet-of-Things devices and device networks.

BACKGROUND

Industrial systems are designed to capture real-world instrumentation (e.g., sensor) data and actuate responses in real time, while operating reliably and safely. The physical environment for use of such industrial systems may be harsh, and encounter wide variations in temperature, vibration, and moisture. Small changes to system design may be difficult to implement, as many statically configured I/O and subsystems lack the flexibility to be updated within an industrial system without a full unit shutdown. Over time, the incremental changes required to properly operate an industrial system may become overly complex and result in significant management complexity. Additionally, many industrial control systems encounter costly operational and capital expenses, and many control systems are not architecturally structured to take advantage of the latest information technology advancements.

The development of Internet of Things (IoT) technology along with software-defined technologies (such as virtualization) has led to technical advances in many forms of telecom, enterprise and cloud systems. Technical advances in real-time virtualization, high availability, security, software-defined systems, and networking have provided improvements in such systems. However, IoT devices may be physically heterogeneous and their software may also be heterogeneous (or may grow increasingly heterogeneous over time), making such devices complex to manage.

Limited approaches have been investigated to utilize IoT devices and IoT frameworks even despite the technical advances that have occurred in industrial automation and systems. Further, industry has been hesitant to adopt new technologies in industrial systems and automation, because of the high cost and unproven reliability of new technology. This reluctance means that typically, only incremental changes are attempted; and even then, there are numerous examples of new technology that underperformed or took long periods of time to bring online. As a result, wide-scale deployment of IoT technology and software-defined technologies has not been successfully adapted to industrial settings.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
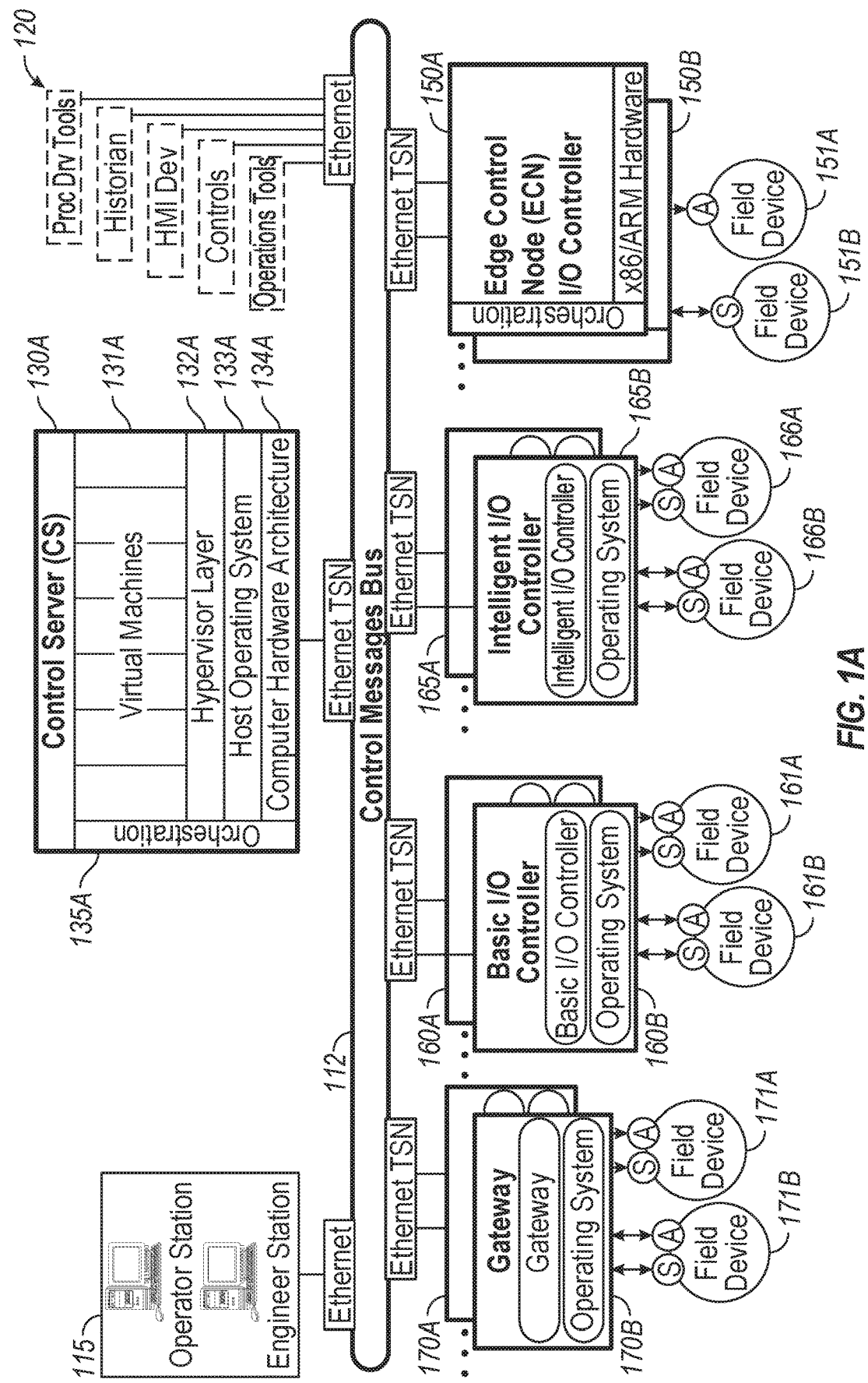
FIG. 1A illustrates a configuration of a software defined infrastructure (SDIS) operational architecture, according to a first example.

In the following description, methods, configurations, and related apparatuses are disclosed for the configuration, operation, and adaptation of software-defined industrial service (SDIS) deployments. In particular, the following SDIS deployments include features of modern operational architecture-based industrial systems, along with derivative architectures or solution instances of such deployments. For instance, such architectures and instances may include virtualized control server systems, which implement features of an edge control device and a control messages bus within a control or monitoring system. Such architecture and instances may be further integrated with aspects of IoT networks, involving various forms of IoT devices and operations.

The processing techniques and configurations discussed herein include a variety of approaches for managing operations, data, and processing within various types of SDIS architectures. An overview of the following approaches are provided in the following paragraphs; further reference to specific implementation examples and use cases is discussed below.

In an example, orchestration of functions may be utilized as a key control point by which customers may leverage differentiating capabilities of hardware deployments. Such orchestration may be enabled by self-descriptive modules, which provide a deployable mechanism for using self-describing control applications and software modules in the context of orchestratable distributed systems. Such self-descriptive modules allow tradeoffs between implementations, such as to allow customers to make effective use of platform features when such features are available, while having alternatives when the features are not. The following examples include implementations in an SDIS architecture that is adapted to automatically evaluate these tradeoffs, thus allowing more effective development of features for industrial use cases and deployments.

Other examples will be apparent from the following drawings and text disclosure.

Overview of Industrial Automation Systems

Designing and implementing effective industrial automation systems presents many technical challenges. Because the lifecycle of an industrial plant in many cases far exceeds the lifecycle of the technology that runs the plant, the administration and maintenance costs of technology are often very difficult to manage. In an example, a SDIS deployment may be adapted for dynamic configuration (and re-configuration) of software and hardware resources in industrial systems through resource abstraction with the following approaches. Such resource abstraction provides flexibility for updating the configuration without removing the industrial system out of service; such resource abstraction also provides flexibility for updating the industrial system with improved capabilities over time.

Use of open architectures and abstracted links between software and hardware in the presently disclosed SDIS approaches provides these and other technical benefits, while allowing vendors to focus on the capabilities and implementation of a specific vendor application. The disclosed open architectures also promote innovation, reduce the cost of hardware replacement, and eliminate the risk of hardware obsolescence. The disclosed open architectures enable security to be implemented as an intrinsic part of the SDIS, such as through the use of a hardware root of trust, signed applications, and comprehensive security management. Such configurations enable a simplified control system with inherent security and the capability to easily integrate capabilities over time. These technical improvements, combined with features of open architecture and standards implementations, enable the rapid integration of industrial control within an SDIS.

Some existing approaches such as the Open Group's Open Process Automation Forum have begun development of a standards-based, open, interoperable process control architecture features for industrial automation, targeting industries such as Food and Beverage, Mining and Metals, Oil and Gas, Petrochemical, Pharmaceutical, Pulp and Paper, and Utilities. The present configuration and functionality of a SDIS and the accompanying subsystems and techniques may be integrated with use of this standard or similar approaches within industrial automation and system deployment efforts. Further, the present configuration and functionality of a SDIS and the accompanying subsystems may be utilized in these or other industries. Accordingly, variations and changes to the following implementations will be evident.

FIG. 1A depicts a first example configuration of an SDIS operational architecture. As shown, a control messages bus 112 is used to connect various components of the architecture, with such components including Operational Tools 120, a Control Server (CS) node 130A, Edge Control Node (ECN) systems 150, Intelligent I/O Controller systems 165, Basic I/O Controller systems 160, Gateway systems 170, and Control Stations 115. Various field devices (151, 161, 166, 171) are connected to the respective systems (150, 160, 165, 170). Some of the example use cases and configurations of this operational architecture are further discussed below.

In an example, the Operational Tools 120 may include aspects of: procedure development tools, historian tools, human-machine interface (HMI) development, controls, and operations tools. Various aspects of the Operational Tools 120 may be implemented with respective virtual machines 131A operating in the control server node 130A (as further depicted in FIG. 2A).

In an example, the control server node 130A may include aspects of various virtual machines 131A, coordinated via a hypervisor layer 132A, and operating with features of a host operating system 133A and a computer hardware architecture 134A. The control server node 130A may be used to implement various aspects of orchestration 135A, involving both machine orchestration and operational application orchestration. A further detailed discussion of the control server node 130A is provided below with reference to FIG. 2A below.

In an example, the ECN systems 150 may include various aspects of orchestration (e.g., orchestration implementation) from an ECN I/O controller (e.g., nodes 150A, 150B) operating on specific hardware (e.g., an x86 or ARM hardware implementation). A further detailed example of the ECN systems 150 and its role in orchestration for various connected devices (e.g., field devices 151A, 151B) is provided below with reference to FIG. 2B.

In an example, the Intelligent I/O systems 165 may include various configurable aspects of industrial control from an Intelligent I/O controller (e.g., controller 165A, 165B) and an accompanying operating system, used for control or access of various devices (e.g., field devices 166A, 166B). Also in an example, the Basic I/O systems 160 may include various operating aspects of industrial control from a Basic I/O controller (e.g., controller 160A, 160B) and an accompanying operating system, used for control or access of various devices (e.g., field devices 161A, 161B).

In an example, the Gateway systems 170 may include various configurable aspects for connection to other device networks or deployments, from a gateway (e.g., gateways 170A, 170B), used for control or access of various devices (e.g., field devices 171A, 171B). Within the various devices, roles of a sensor ("S") and actuator ("A") components are labeled throughout the field devices (e.g., on field devices 151A, 151B, 161A, 161B, 166A, 166B, 171A, 171B). It will be understood that additional number and types of devices and components may also be coupled to the various systems 150, 160, 165, 170.

The operational architecture depicted in FIG. 1A is configured to enable many of the same attributes seen in traditional enterprise architectures, such as HW/SW modularity, SW portability, interoperability, application extensibility and computational scalability. Beyond this, the new infrastructure framework components introduced in this architecture, most notably in the implementation of CS and ECN systems, may be deployed to support both centralized and decentralized concepts for the SDIS techniques discussed herein.

For example, the use of an ECN I/O Controller (e.g., in ECN nodes 150A, 150B) is a significant architecture departure from current DCS (Distributed Control System) and PLC (programmable logic controller) control systems, which have evolved for over the last fifty years. Any architectural advancement in this mission-critical portion of the ANSI/ISA-95 automation interface stack must adhere to the strict and resilient requirements of process control. With the SDIS architecture described herein, the ECN system may not only maintain these strict operational requirements, but also may remain open, interoperable, while allowing industry uses to safely, reliably, securely and rapidly introduce or refresh these systems with ongoing technological advancements. The present SDIS architecture enables wider ecosystem participation, innovation and production customization throughout the operational and control stack. For instance, the ECN system may be provided with control disaggregation to serve as a basic control system building block, to amplify control function customization and enable increased process flexibility for a variety of use cases.

Figure 1B:
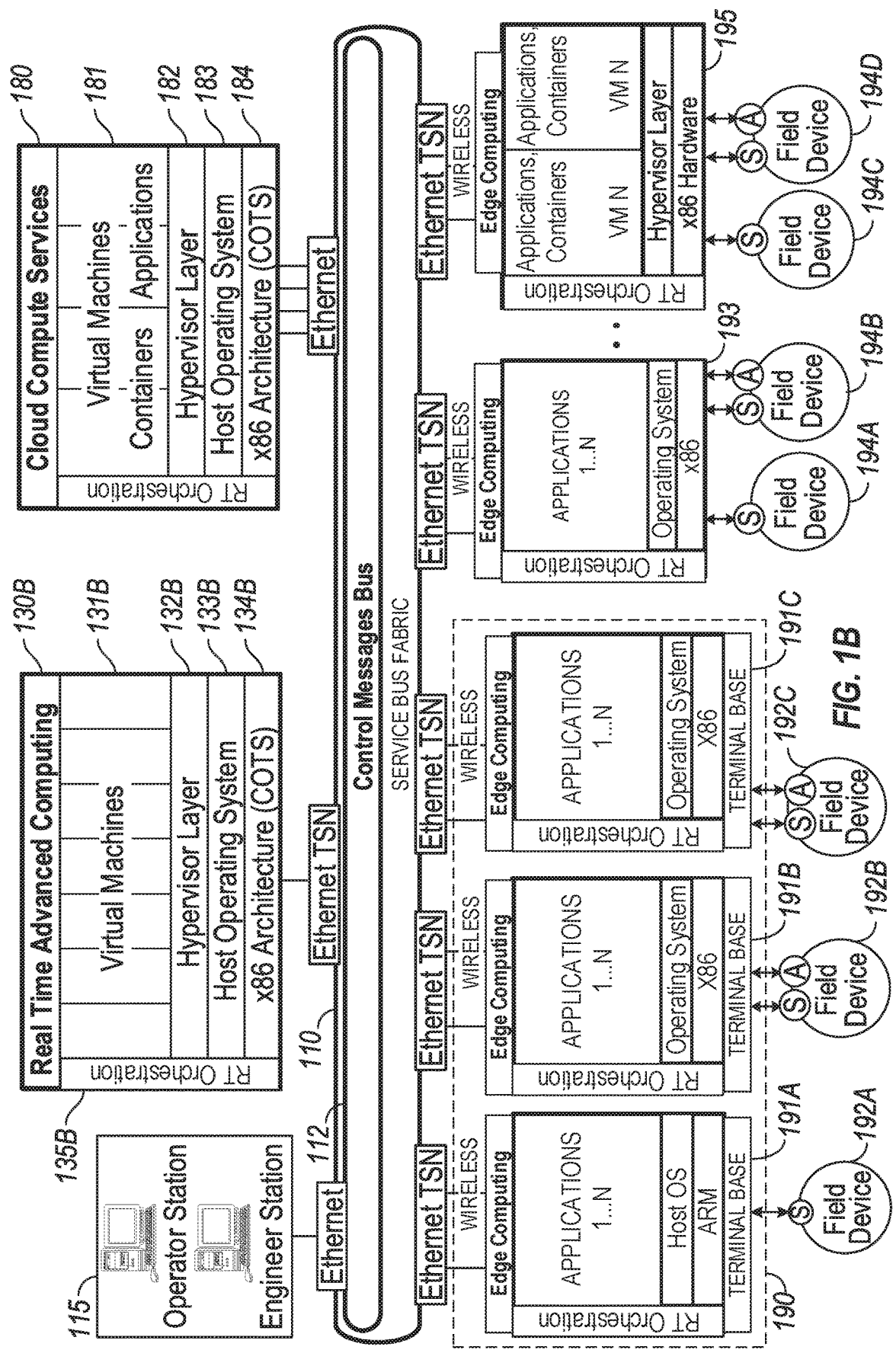
FIG. 1B illustrates a configuration of an SDIS operational architecture, according to a second example.

FIG. 1B depicts a second example configuration of an SDIS operational architecture. In a similar fashion as shown as FIG. 1A, the configuration of FIG. 1B illustrates a control messages bus 112 that is used to connect various components of the operational architecture, with such components including cloud components (a real time advanced computing system 130B, operating as a control server, and cloud computing services 180) edge components (an edge ecosystem 190 with constituent edge computing nodes 191A, 191B, 191C, a first edge computing platform 193, and a second edge computing platform 195), and Control Stations 115. Various field devices (192, 194) with sensors and actuators are connected to the respective edge computing nodes (in the edge ecosystem 190 and edge computing platforms 193, 195). The operational goals and features discussed above are also applicable to the configuration of FIG. 1B.

Figure 3A:
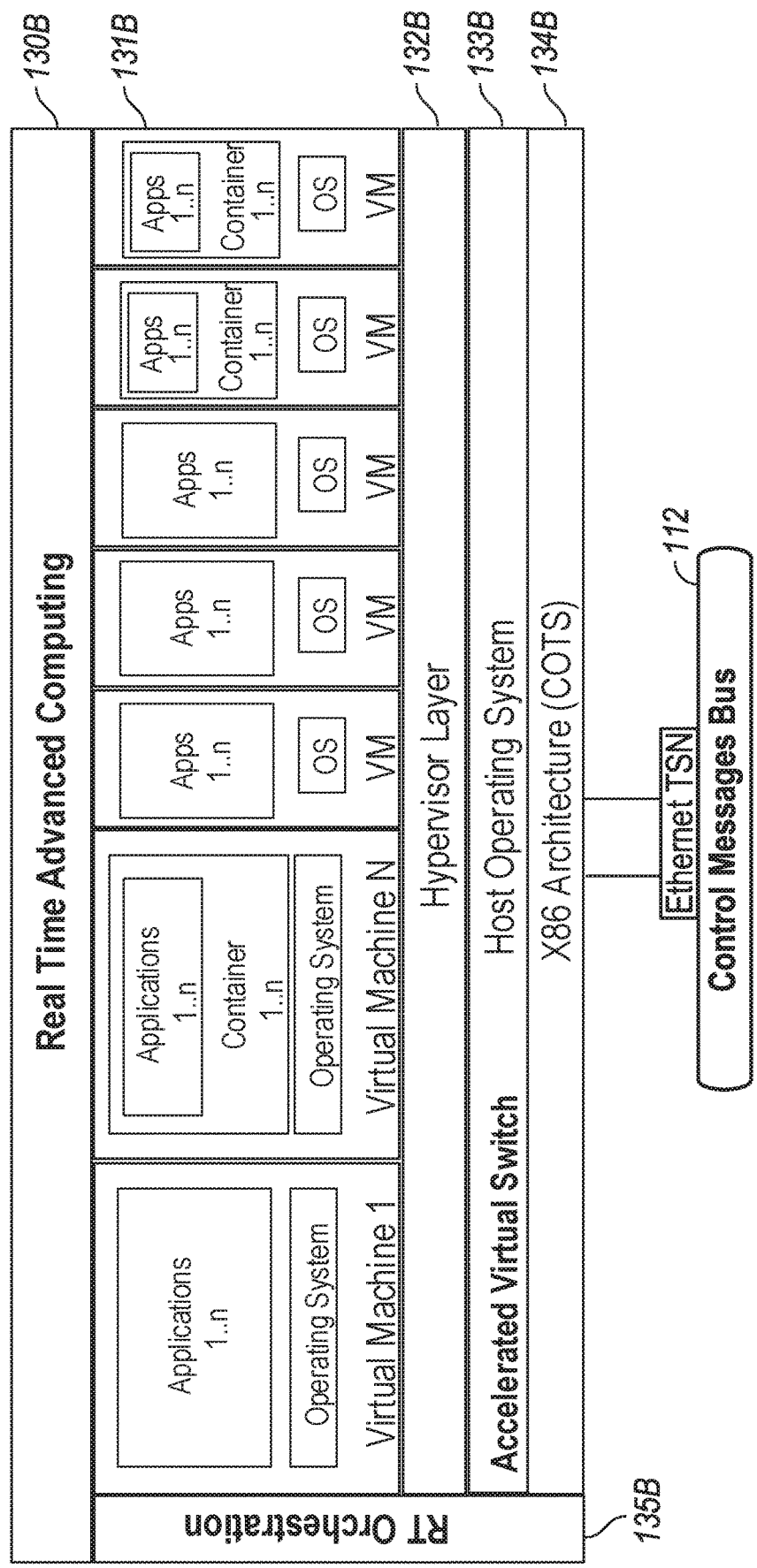
FIG. 3A illustrates a configuration of a real-time advanced computing subsystem deployable within the SDIS operational architecture of FIG. 1B, according to an example.

As a further extension of the SDIS operational architecture introduced in FIG. 1A, the configuration of FIG. 1B illustrates a scenario where the operations of the controllers and servers across the various cloud and edge components are virtualized through respective virtual machines, deployed with respective containers, deployed with respective applications, or any combination thereof. As a result, the SDIS operational architecture of FIG. 1B allows a reconfigurable and flexible deployment to a variety of hardware settings (including both ARM and x86 hardware architectures). A further breakout of the real time advanced computing system 130B is depicted in FIG. 3A, and further breakout of the cloud computing services node 180 and the edge computing node 193 is discussed in FIGS. 3B and 3C respectively.

Another aspect of the SDIS architecture may involve the use of real-time communications. The control messages bus 112, hosted on a service bus fabric 110, may be utilized to enable internetworking convergence on multiple levels. For instance, the control messages bus 112 may enable use of Ethernet transports with time-sensitivity, such as through Ethernet-based time-sensitive networking (TSN) open standards (e.g., the IEEE 802.1 TSN Task Group). Further, use of the control messages bus 112 may allow greater performance and scale at the cloud server rack level and across large networked or chassis of edge nodes.

In the SDIS architecture, real-time services may operate on top of a real-time physical transport via the control messages bus 112, such as via Ethernet TSN. The control messages bus 112 may be adapted to address the heterogeneity of existing middleware or communication stacks in an IoT setting (e.g., with use of Open Platform Communications Unified Architecture (OPC-UA), Object Management Group Data Distribution Service (DDS), OpenDXL, Open Connectivity Foundation (OCF), or the like standards), to enable seamless device-to-device connectivity to address the emerging implementations of IoT deployments.

Figure 2A:
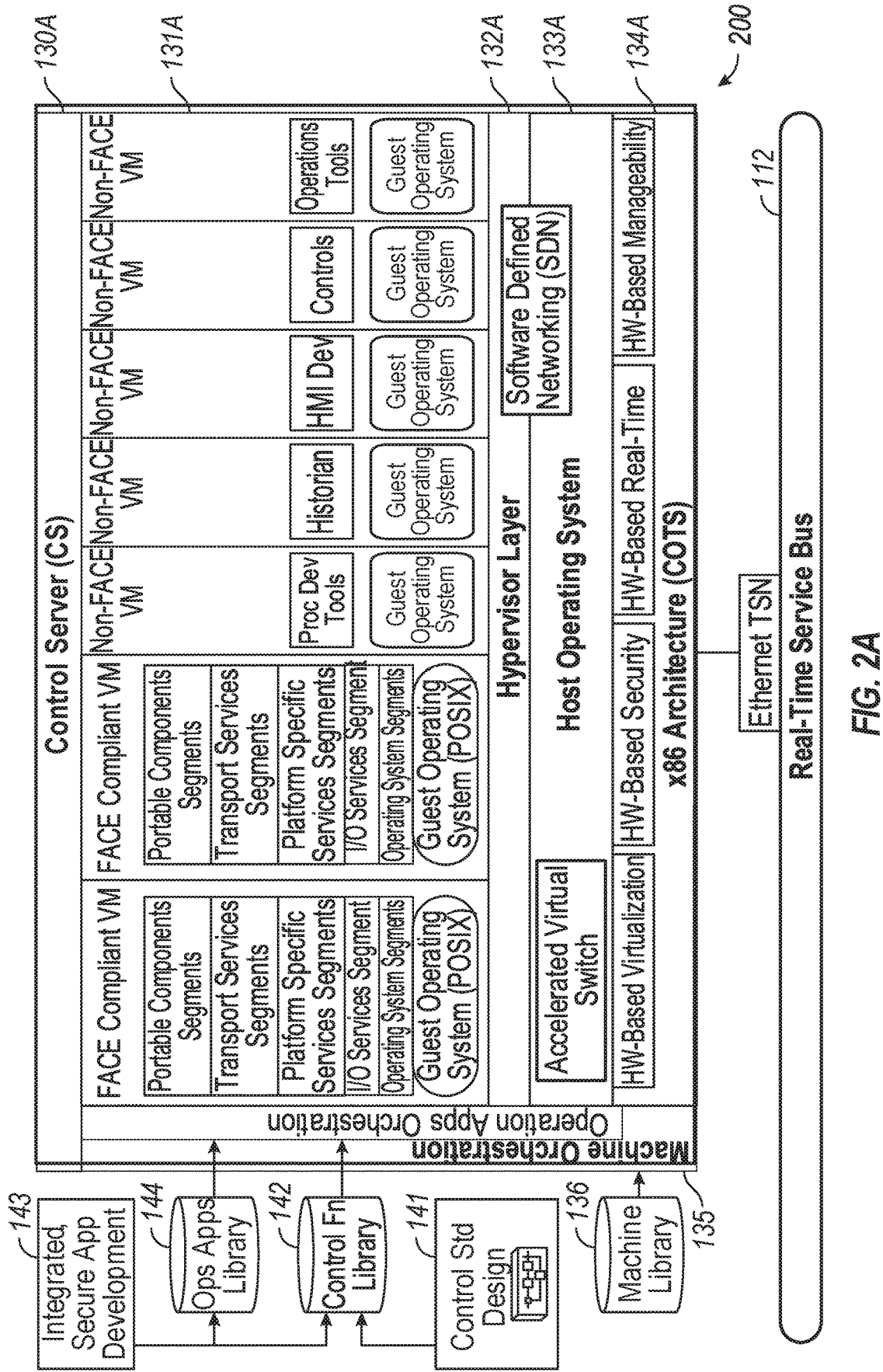
FIG. 2A illustrates a configuration of a real-time advanced computing subsystem deployable within the SDIS operational architecture of FIG. 1A, according to an example.

In an example, the orchestration management for a SDIS architecture may be implemented by a Control Server (CS) design. FIG. 2A illustrates a configuration of a control server subsystem (e.g., implementing the CS node 130) within an SDIS operational architecture (e.g., the operational architecture discussed above with reference to FIG. 1A). Specifically, FIG. 2A provides a further illustration of the CS node 130A and its component virtual machines 131A, hypervisor 132A, host operating system 133A, and hardware architecture 134A; as depicted, the CS node 130A is shown as a single node but may include two or more nodes with many virtual machines distributed across these nodes.

In an example, the CS node 130A may include orchestration 135A that is facilitated from machine and operation application orchestration. The machine orchestration may be defined with use of a machine library 136, such as a database for implementing platform management; the operation application orchestration may be defined with use of a control function library 142 and operational application library 144. For instance, control standards design 141 and integrated (and secure) application development processes 143 may be used to define the libraries 142, 144.

In an example, the CS node 130A is designed to host ISA level L1-L3 applications in a virtualized environment. This may be accomplished by running virtual machines (VMs)

131A on top of a hypervisor 132A with each VM encapsulating Future Airborne Capability Environment (FACE)-compliant stacks and applications, or non-FACE applications such as a human-machine interfaces (HMIs), Historians, Operations Tools, etc. In an example, FACE-compliant VMs may provide an entire FACE stack (operating system, FACE segments, and one or more portable components) that is encapsulated in a VM. The encapsulation means that each VM may have its own virtual resources (compute, storage, memory, virtual networks, QoS, security policies, etc.) isolated from the host and other VMs by the hypervisor 132A, even as each VM may be running different operating systems such as Linux, VxWorks, or Windows.

To maximize the benefit of virtualization and robustness, related groups of portable components may be grouped in a FACE-compliant VM and with the use of multiple FACE-compliant VMs. Using this approach spreads the workload across the CS hardware and isolates resources specific to that group of components (such as networks), while still allowing the applications to communicate with other virtualized and physical devices such as ECNs through the network. Distributing the FACE portable components across VMs increases security by isolating unrelated components from each other, provides robustness to failures, allows independent update of functions, and eases integration to allow individual vendors to provide fully functioning VMs into the system.

In a further example, Layer 2 components may be separated from Layer 3 components within separate VMs (or groups of VMs) to provide isolation between the layers and allow different network connectivity, security controls, and monitoring to be implemented between the layers. Grouping portable components may also provide benefits to integration, to allow multiple vendor solutions to be easily combined running multiple virtual machines and configuring the network between them. Also in a further example, additional operating systems such as Windows, Linux, and other Intel architecture-compatible operating systems (e.g. VxWorks real-time operating system) may each be deployed as virtual machines. Other configurations of the presently disclosed VMs within a CS node 130A may also enable other technical benefits.

In an example, a cloud infrastructure platform may be utilized in the CS node 130A, such as a real-time advanced computing system adapted with use of open source standards and implementations such as Linux, KVM, OpenStack, and Ceph. For instance, the cloud infrastructure platform may be adapted to address critical infrastructure requirements such as high availability of the platform and workloads, continuous 24/7 operation, determinism/latency, high performance, real-time virtualization, scalability, upgradeability, and security. The cloud infrastructure platform also may be adapted to meet software-defined industrial automation-specific critical infrastructure requirements.

Figure 2B:
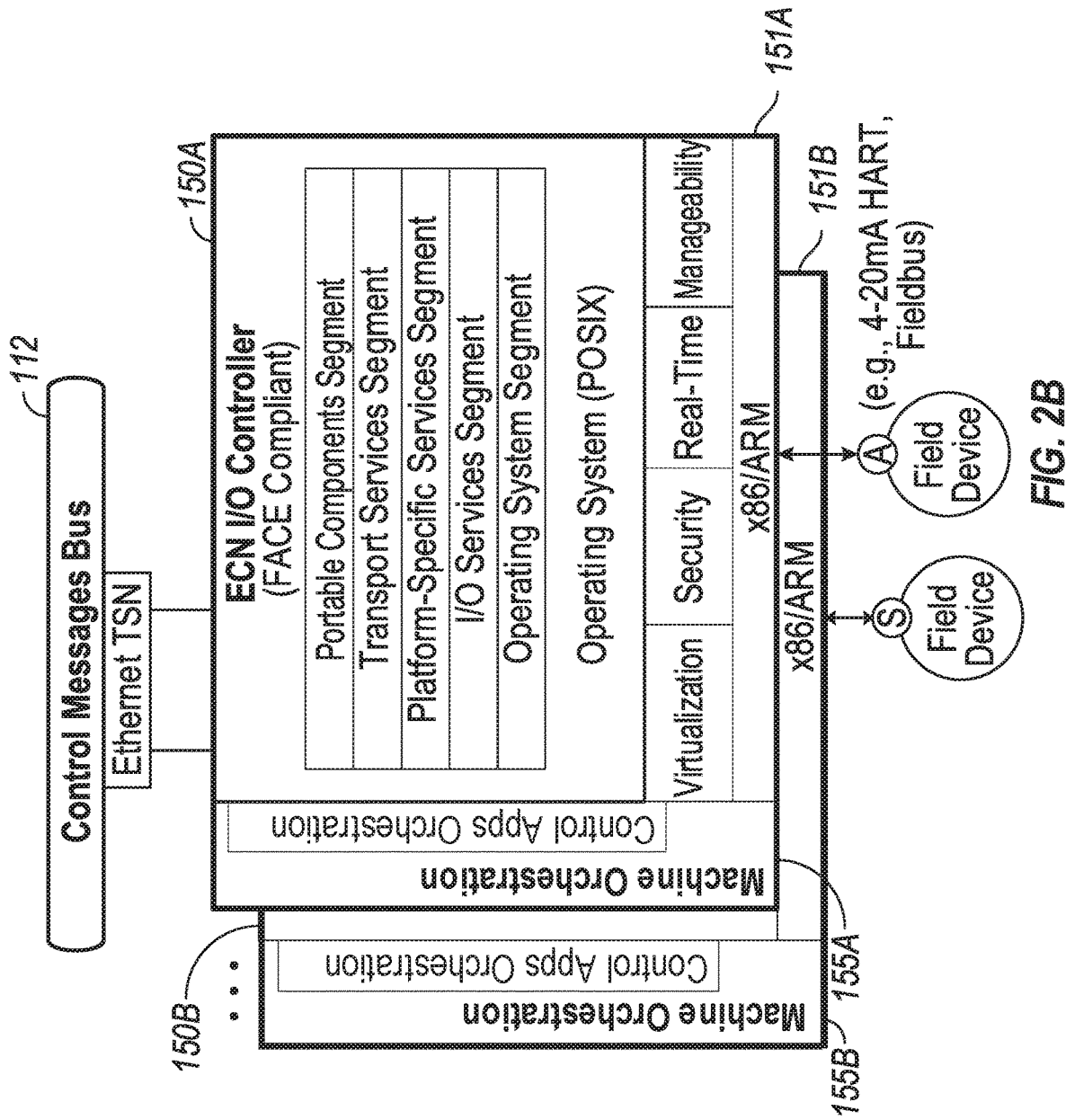
FIG. 2B illustrates a configuration of an edge control node subsystem deployable within the SDIS operational architecture of FIG. 1A, according to an example.

FIG. 2B illustrates an example configuration of a distributed edge control node (ECN) subsystem within an SDIS operational architecture (e.g., the operational architecture discussed above with reference to FIG. 1A). In an example, the ECN nodes 150A, 150B reside in the ISA-95 Level 1/Level 2 and are positioned as a fundamental, basic HW/SW building block.

In an example, the ECN nodes 150A, 150B support a single input or output to a single field-bus device via a sensor or actuator or smart device (e.g., located externally to an ECN cabinet). The ECN device architecture may be extended through an ECN cabinet or rack system that extends the openness and flexibility of the distributed control system addressing wiring, upgrade, and fault-tolerance limitations with existing proprietary DCS systems. In an example, the ECN architecture operates in a standard POSIX OS with a FACE-compliant stack implemented as segments or groups software modules. Various approaches for deployment of these software modules are referenced in the examples below.

The ECN nodes 150A, 150B may support a variety of software-defined machines for aspects of orchestration and services (such as the orchestrations depicted below for FIG. 6). In an example, the ECN nodes 150A, 150B may integrate with various hardware security features and trusted execution environment, such as Intel® Software Guard eXtensions (SGX), Dynamic Application Loader (DAL), secure VMM environments, and trusted computing-standard Trusted Platform Module (TPM). In a further example, secure boot may be enabled with fused and protected key material accessed within protected hardware cryptographic engines, such as Intel® Converged Security and Manageability Engine (CSME) and Platform Trust Technology (PTT). Additionally, cryptographic functions may be made more secure with special hardware instructions for AES encryption and SHA computations. Other forms of security such as an Intel® Enhanced Privacy ID (EPID) may be being adopted across the industry as a preferred device identity key, which can be enabled through automated device registration (e.g., Intel Secure Device Onboarding (SDO)) technology for secure, zero-touch onboarding of devices. In further examples, the ECN nodes 150A, 150B and other subsystems of the SDIS architecture may be interoperable with these or other security approaches.

FIG. 3A illustrates a more detailed configuration of the real-time advanced computing system 130B deployable within the SDIS operational architecture of FIG. 1B. Specifically, the configuration of FIG. 3A illustrates the operation of respective virtual machines 131B which may include different deployment types of virtual machines, containers, and applications, operating on a hypervisor layer 132B. The hypervisor layer 132B may be controlled with use of a host operating system 133B, as the VMs, hypervisor, and operating system execute on the hardware architecture 134B (e.g., a commercial off-the-shelf (COTS) x86 architecture). The aspects of real time orchestration 135B may be integrated into all levels of the computing system operation. Thus, a x86 computing system may be adapted to coordinate any of the cloud- or server-based SDIS functions or operations discussed herein. Other aspects of functionality or hardware configuration discussed for the CS node 130A may also be applicable to the computing system 130B.

Figure 3C:
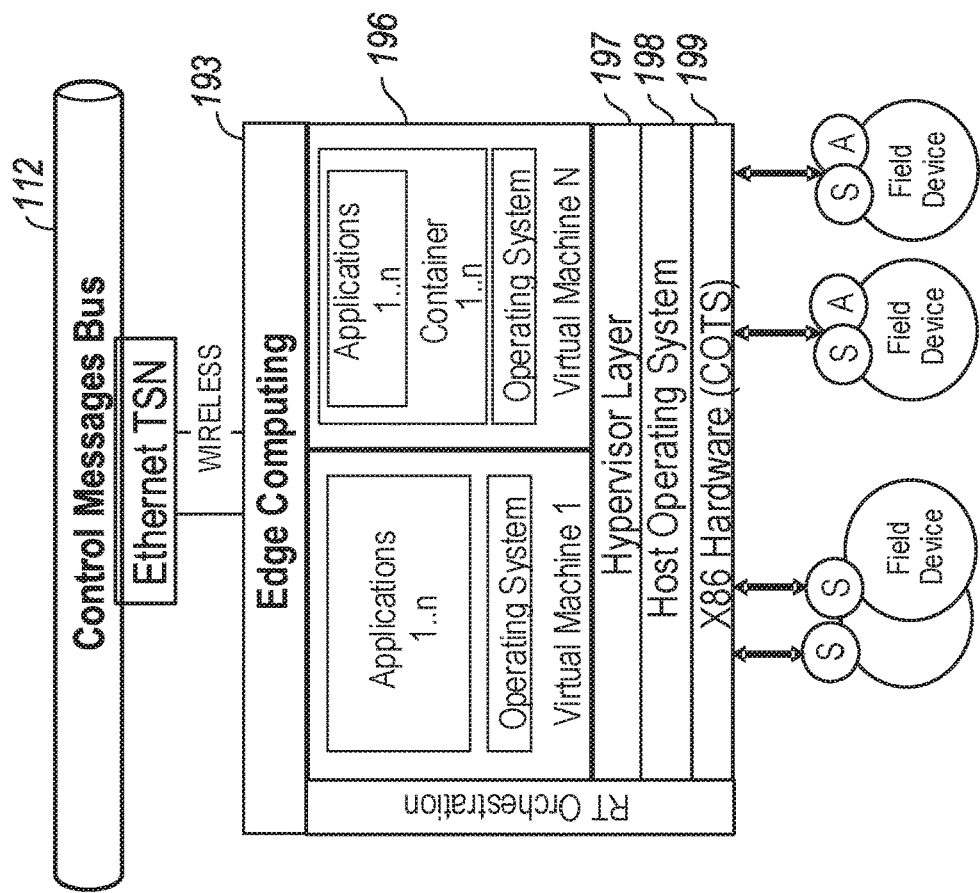
FIGS. 3B and 3C illustrates a configuration of cloud computing and edge computing subsystems deployable within the SDIS operational architecture of FIG. 1B, according to an example.
Figure 3B:
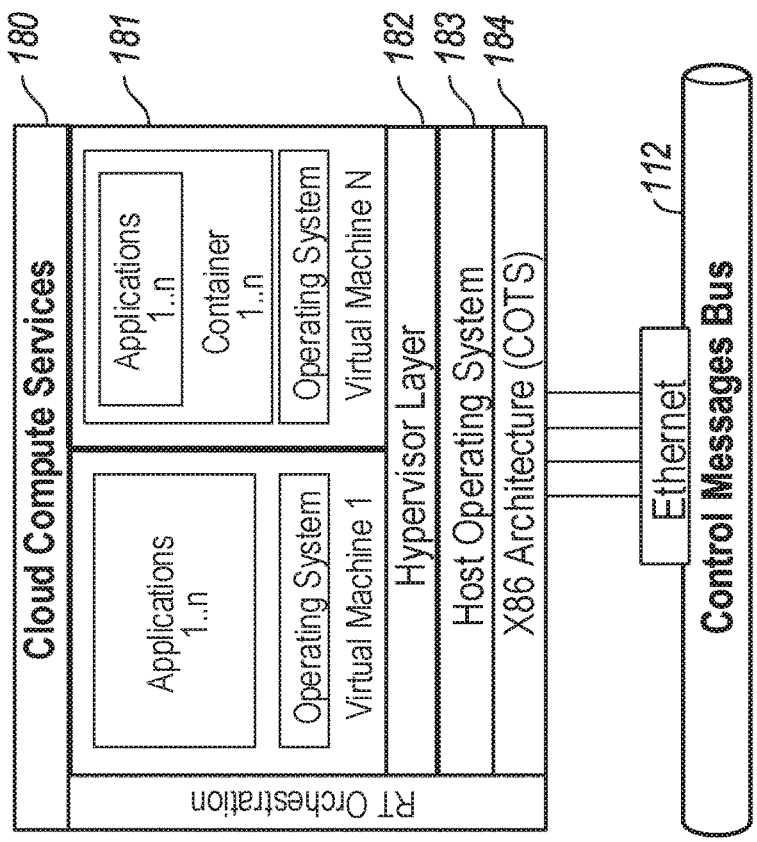

FIGS. 3B and 3C illustrates a more detailed configuration of cloud computing 180 and edge computing 193 subsystems, respectively, deployable within the SDIS operational architecture of FIG. 1B. In a similar fashion as depicted in FIG. 3A, a series of virtual machines 181, 196, hypervisor layers 182, 197, host operating systems 183, 198, and COTS x86 hardware architectures 184, 199 depicted in FIGS. 3B and 3C may be adapted to implement the respective systems 180, 193. Applications and containers may be used to coordinate the cloud- and edge-based functionality, under the control of real-time orchestration. Other aspects of functionality or hardware configuration discussed for the ECN nodes 150 may also be applicable to the edge computing node 193. The edge computing node 193 may implement control functions to control a field device.

Systems and techniques described herein may integrate "Mobile-edge Computing" or "Multi-Access Edge Computing" (MEC) concepts, which accesses one or multiple types of Radio Access Networks (RANs) to allow increases in speed for content, services, and applications. MEC allows base stations to act as intelligent service hubs, capable of delivering highly personalized services in edge networks. MEC provides proximity, speed, and flexible solutions to a variety of mobile devices, including devices used in next-generation SDIS operational environments. As an example, a MEC approach is described in "Mobile-Edge Computing, A key technology towards 5G," a paper published by the European Telecommunications Standards Institute (ETSI) as ETSI White Paper No. 11, by Yun Chao Hu, et al., ISBN No. 979-10-92620-08-5, available at http://www.etsi.org/news-events/news/1009-2015-09-news-new-white-paper-etsi-s-mobile-edge-computing-initiative-explained, which is incorporated herein in its entirety. It will be understood that other aspects of 5G/next generation wireless networks, software-defined networks, and network function virtualization, may be used with the present SIDS operational architecture.

Figure 4:
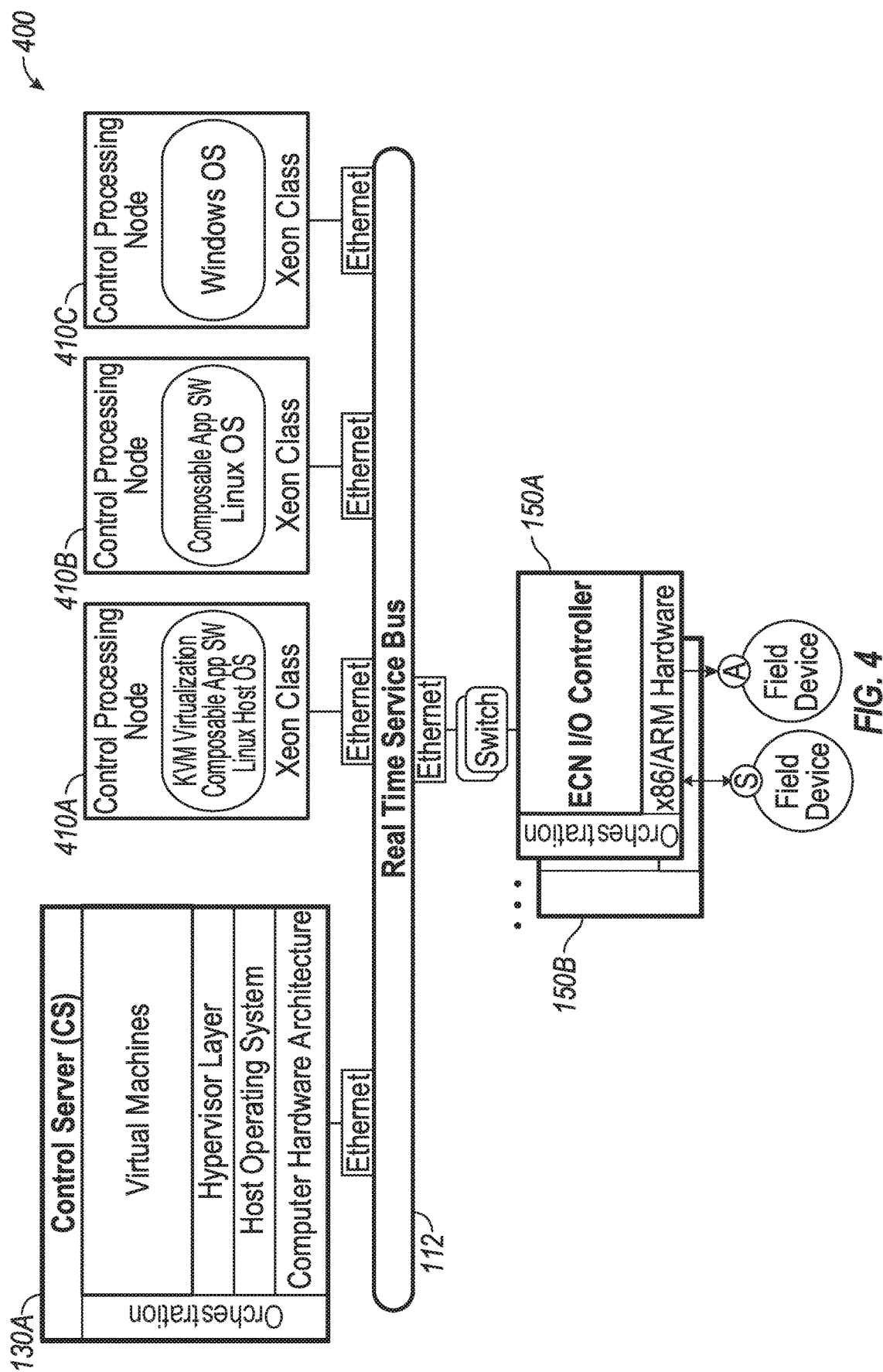
FIG. 4 illustrates a configuration of a control messages bus used within an SDIS operational architecture, according to an example.

FIG. 4 illustrates an example configuration 400 of a real-time service bus (e.g., a configuration of the control messages bus 112) used within an SDIS operational architecture. This configuration allows support for various processing control nodes, as discussed herein. For instance, the control messages bus 112 may be used to connect respective control processing nodes 410 (including various hardware and software implementations on nodes 410A, 410B, 410C) and cloud-based services or control server(s) 130A with various edge devices 420 (e.g., I/O controllers 150, 160, 165, or edge computing nodes 191, 193, 195).

In an example, the control messages bus 112 may be implemented to support packet level, deterministic, control networks, with rate monotonic control requirements. These features have conventionally been provided by proprietary Distributed Control System (DCS), Supervisory Control And Data Acquisition (SCADA) or Programmable Logic Controller (PLC) components. Most of these systems were engineered to design parameters that limited the number of nodes and data elements with little ability to dynamically manage the quantity and quality of the data for what is commonly a closed and isolated network within the facility. Over the lifecycle of these systems, the desire to implement emerging new use cases has been severely limited by the underlying inflexibility and limited scalability of expensive control system infrastructure.

With prior approaches, both open source and open standards-based service bus middleware options have matured to the point that the critical mission ecosystem of solution providers have embraced these technologies as "best-in-breed" capabilities to build scalable, highly redundant, fault tolerant, real-time systems at a fraction of the historical cost. This has sparked a realization of new use cases that may be achieved for both discrete and continuous processing where commodity level hardware and open source, standards based software have converged to enable real-time compute methods, while maintaining service oriented architecture based design principles.

In an example, control messages bus technologies may be extended further by enabling real-time compute at the hardware level by enabling Time Sensitive Networking (TSN) and Time Coordinated Compute (TCC) both between and within platform nodes of a network. Both proprietary and open standard-based solutions may be integrated with commodity hardware enabled enhancements, including utilizing industry standards offered by the OPC-UA (OPC Unified Architecture) and DDS (Data Distribution Service) groups, and proprietary implementations like the SERCOS standards where hard real-time requirements for discrete motion control are mandatory in robotic and machine control applications.

In an example, the control messages bus and the overall SDIS architecture may also be integrated with the Industrial Internet Consortium (IIC) features. These may include various formulating and testing standards for the industrial use of TSN, which may enhance the performance and QoS of both DDS and OPC-UA based solutions by dramatically reducing both packet level latency and jitter. Further, aspects of Object Management Group (OMG) and the OPC Foundation standards may be positioned to support increased integration of OPC-UA and DDS implementation models that leverage the information modeling of OPC-UA, and the QoS and performance capabilities of DDS in architectural design. New use cases may include analytics and autonomous capabilities.

In an example, the SDIS architecture may be integrated with the use of Software Defined Networking (SDN) features. SDN is a movement towards a software programmable network that separates the control plane from the data plane to make the network and network functions more flexible, agile, scalable, and less dependent on networking equipment, vendors, and service providers. Two key use cases of SDN relevant to SDIS include: service function chaining, which allows dynamic insertion of intrusion detection/prevention functions, and dynamic reconfiguration to respond to events such as larger scale outages such as zone maintenance, natural disasters, etc. Further, the SDIS architecture may be integrated with an SDN controller to control virtual switches using networking protocols such as Open vSwitch Database Management Protocol (OVSDB). Other use cases of SDN features may involve dynamic network configurations, monitoring, and the abstraction of network functions in virtualized and dynamic systems.

Figure 5A:
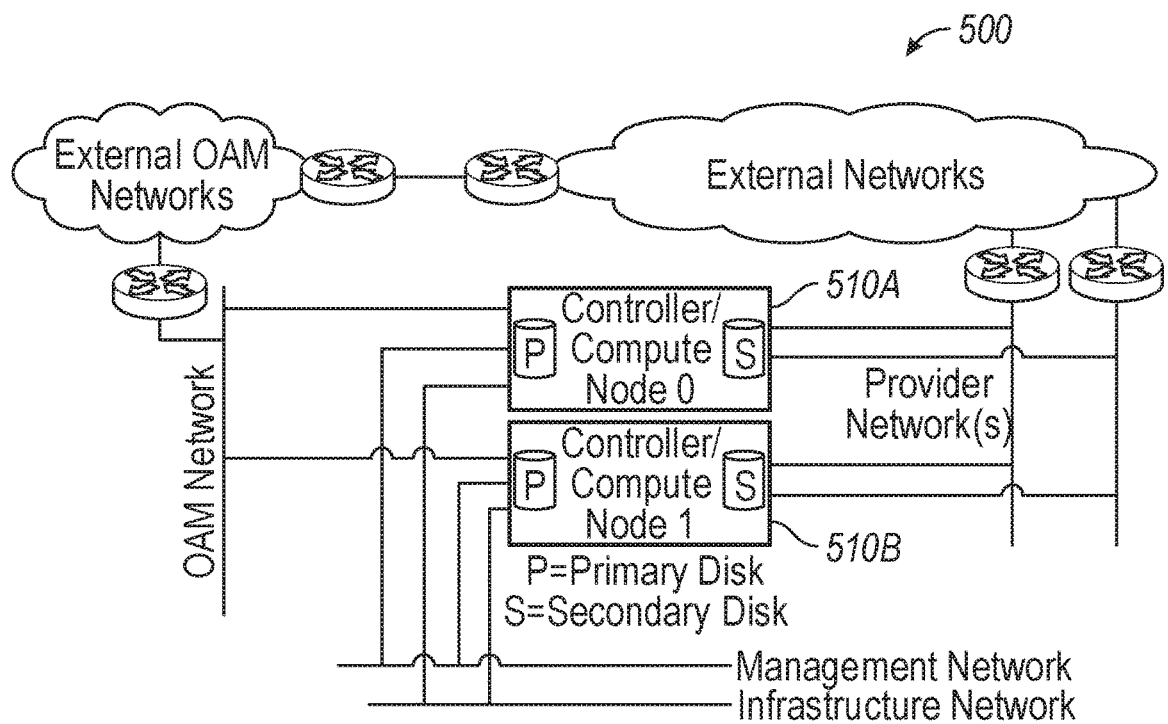
FIG. 5A illustrates a first network configuration for deployment of SDIS subsystems, according to an example.

FIG. 5A illustrates a first network configuration 500 for an example deployment of SDIS subsystems. The first network configuration 500 illustrates a scaled-down, small-footprint deployment option that combines controller, storage, and compute functionality on a redundant pair of hosts (nodes 510A, 510B). In this configuration, the controller functionality (for control applications or implementations) is active/standby across the nodes 510A, 510B while the compute functionality (for all remaining processes) is active/active, meaning that VMs may be deployed to perform compute functionality on either host.

For example, LVM/iSCSI may be used as the volume backend that is replicated across the compute nodes, while each node also has a local disk for ephemeral storage. Processor bandwidth and memory may be also reserved for the controller function. This two-node solution may provide a lower cost and lower footprint solution when less processing and redundancy is needed.

Figure 5B:
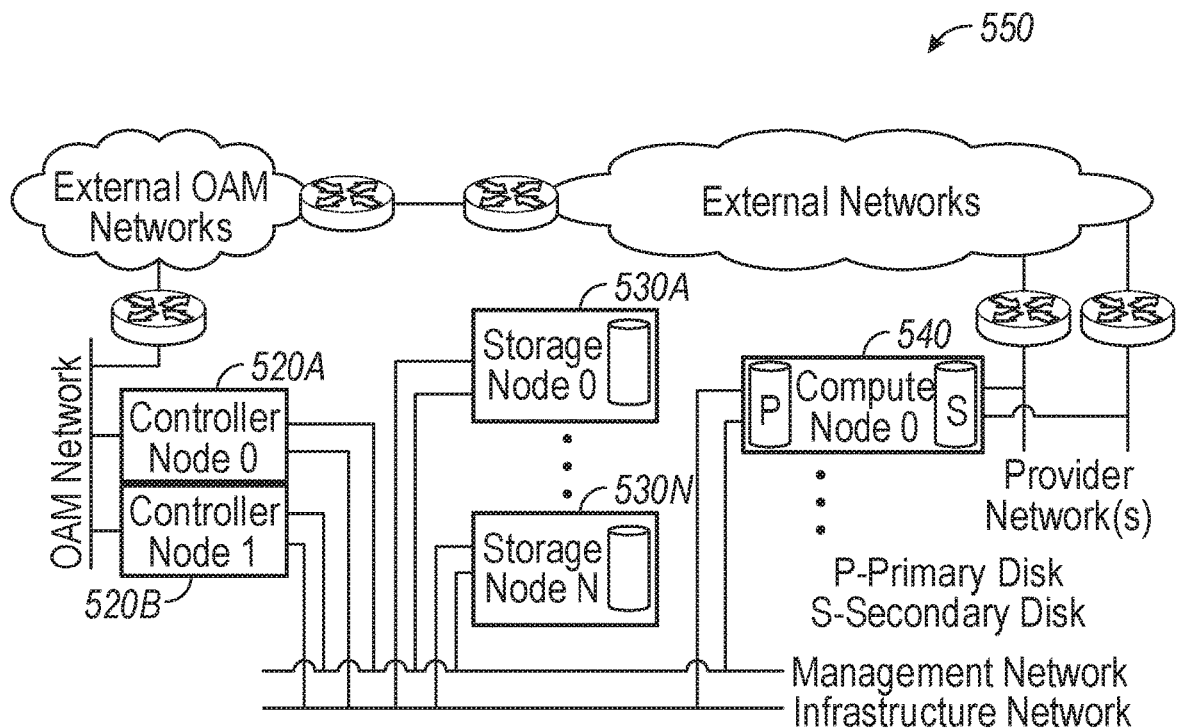
FIG. 5B illustrates a second network configuration for deployment of SDIS subsystems, according to an example.

FIG. 5B illustrates a second network configuration 550 for deployment of SDIS subsystems. The second network configuration 550 may provide dedicated storage nodes with high capacity, scalability, and performance. As compared with the first network configuration 500, the second network configuration 550 allows controller, storage, and compute functionalities to be deployed on separate physical hosts, allowing storage and compute capacity to scale independently from each other.

In an example, the second network configuration may be provided from a configuration of up to eight storage nodes (nodes 530A-530N) and eight disks per storage node in a high availability (e.g., Ceph) cluster (e.g., coordinated by controller nodes 520A, 520B), with the high availability cluster providing image, volume, and objects storage for the compute nodes. For instance, up to 100 compute nodes (e.g., node 540) may be supported, each with its own local ephemeral storage for use by VMs. As will be understood, a variety of other network configurations may be implemented with use of the present SDIS architecture.

The SDIS architecture and accompanying data flows, orchestrations, and other features extended below, may also utilize aspects of Machine Learning, Cognitive Computing and Artificial Intelligence. For instance, The SDIS architecture may be integrated with a reference platform with foundations in hardware-based security, interoperable services, and open-source projects, including the use of big data analytics and machine learning for cybersecurity. The SDIS architecture may utilize immutable hardware elements to prove device trust, and characterize network traffic behavior based on filters augmented with machine learning to separate bad traffic from benign.

The various components of the SDIS architecture may be integrated with a rich set of security capabilities to enable an interoperable and secure industrial system within real-world industrial settings. For example, such security capabilities may include hardware-based roots of trust, trusted execution environments, protected device identity, virtualization capabilities, and cryptographic services upon which a robust, real-time security architecture may be founded. The configuration and functionality of such components within a functional SDIS architecture deployment is further discussed in the following sections.

Overview of Functional Orchestration

Figure 6:
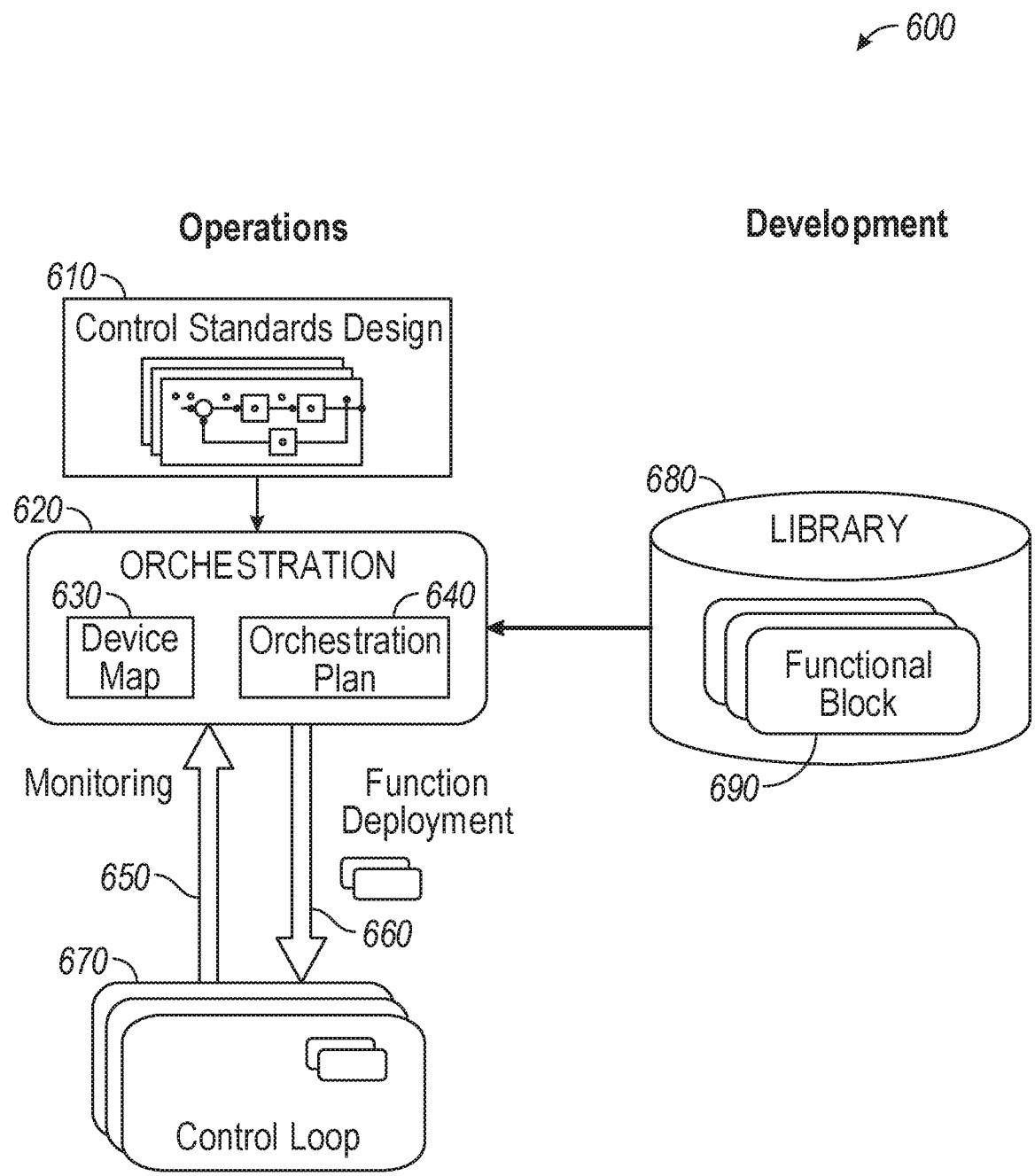
FIG. 6 illustrates a dynamically established set of orchestration operations in a SDIS operational architecture, according to an example.

FIG. 6 illustrates an example of dynamically established set of orchestration operations 600 with use of a Composable Application System Layer (CSL) in a SDIS operational architecture. The CSL may be utilized to enable a secure design and orchestration of control functions and applications to support industrial operations.

In an example, the CSL maintains a library 680 of functional blocks 690, each representing control-loop logic and application components. Each functional block may be interoperable with other functional blocks. A functional block may have multiple implementations, making it portable, such that it may operate on various platform architectures and leverage special features if available (e.g. hardware accelerators). In an example, the CSL provides a control function for a cluster of edge nodes (e.g., ECNs); in further examples, the CSL provides control for VMs in the control server or other computation points in the SDIS operational architecture.

In an example, a process engineer (or other operator) defines control flows and applications by combining and configuring existing functional blocks 690 from the library 680. These functional blocks 690 may represent application logic or control loops (e.g., control loops 670, data storage, analytics modules, data acquisition or actuation modules, or the like), control modules, or any other computation elements. Because these functional blocks 690 are reusable and interoperable, new code needs to be written only when new functional blocks are required. In further examples, such functional blocks may be utilized to implement end-to-end logic, including control flows or end-to-end applications using a graphical, drag-and-drop environment.

Starting from this application design, the CSL generates an orchestration plan 640 that specifies the required functional blocks and the requirements for points of computation to execute those functional blocks. As discussed in the following sections, orchestration 620 may encompass the process of mapping the orchestration plan 640 to available compute and communication resources. The orchestration 620 may be further adapted based on control standards design 610 (e.g., to conform the resulting orchestration to various control laws, standards, or requirements).

In an example, the CSL maintains a map 630 of computing and control resources across the SDIS network. The map 630 comprehends the topology of various compute points, from virtual machines in a data center to control points and the attached sensors and actuators. The map 630 also includes the hardware capabilities and dynamic characteristics of the control points. The map is updated regularly, allowing the system to constantly adapt to component failures. The orchestration 620 and the control loop 670 communicate using monitoring logic 650 and function deployments 660. The monitoring logic 650 outputs information from a field device or the control loop 670, which is used as an input to the map 630. The function deployment 660 is used as an input or state setting for the control loop 670.

When an operator deploys a new application definition (e.g., the orchestration 620 receives an output from the control standards design 610), the orchestration 620 determines how to best fit the functional blocks 690 to the set of available resources in map 630, and deploys the underlying software components that implement the functional blocks 690. Deployment of an end-to-end application may include, for example, creating virtual machines within a server, injecting code into control loops (e.g., control loops 670), and creating communication paths between components, as needed. Orchestration 620 also may be dynamic to allow functional blocks to be migrated upon failure of a computational resource, without requiring a system-wide restart. In addition, updates to the implementation of a component may be pushed, causing code to be updated as needed.

The CSL may also incorporate security and privacy features, such as to establish trust with participating devices (including edge nodes or a control server). In further examples, the CSL may be integrated with key-management used for onboarding new devices and revoking obsolete devices. The CSL may deliver keys to function blocks 660 to enable secure communication with other function blocks 660. The CSL may also deliver secured telemetry and control, integrity and isolated execution of deployed code, and integrity of communication among functional blocks 690.

Orchestration technologies today predominantly execute by function, application, virtual machine, or container technology. However, inherent dependencies between distributed applications are not generally managed in low-latency, high frequency mission-critical timeframes for control strategy implementations today. For embedded systems in general, dynamic orchestration historically has not been applied due to the technical limitations of managing application dependencies at runtime.

In an example, features of an SDIS architecture may be adapted to support the holistic orchestration and management of multiple dependent applications (function blocks) that execute across a distributed resource pool, to enable orchestration at an embedded control strategy level in a distributed system configuration. This provides a control strategy orchestration capability to operational technology environments while elevating overall system performance at an expected reduced total cost. For instance, an example orchestration method may incorporate dynamic network discovery, resource simulation in advance of any orchestration action, and simulation coupled with global resource optimization and prediction utilized as part of an orchestrator rule set decision tree.

The distributed resource pool may encompass applications that span: (a) a single application running in a single native device, where a second redundant application is available on an additional native device; (b) multiple coordinated applications running in multiple native devices; (c) multiple coordinated applications running in a single virtual machine, where the virtual machine is running on a single embedded device or server; (d) multiple coordinated applications running across multiple virtual machines, where each virtual machine runs in a dedicated embedded device or server; (e) multiple coordinated applications that span multiple containers contained in one virtual machine, where the virtual machine runs in a dedicated embedded device or server; or (f) multiple coordinated applications spanning multiple containers, where the containers are running on multiple embedded devices or servers. Any mixture of these application scenarios may also apply.

In an example, orchestration may include measurement of resources or reservation of resources, such as compute resources on a node (e.g., on the CPU or special purpose compute blocks like an FPGA or GPU), particular device capabilities (access to a sensor/actuator, security device (e.g., TPM), pre-installed software), storage resources on a node (memory or disk), network resources (latency or bandwidth, perhaps guaranteed via TSN), or the like.

An extended orchestrator rule set may be defined to include criteria beyond standard compute, storage, and memory metrics, such as to specify application cycle time, application runtime, application input/output signal dependency, or application process sequencing (e.g. a mandatory sequence that specifies which application(s) runs before or after other application blocks). This orchestration technique may provide the ability, at a distributed application control strategy level, to leverage lower cost commodity hardware and software to achieve better system performance at a control strategy level, while enabling new levels of system redundancy and failover at a lower cost across multiple applications running in ISA levels L1-L3. Further, orchestration sensitivity at the broader control strategy level may enable new levels of high availability for embedded systems at a lower cost. This may result in an increase of general system and application uptime for orchestrated and coordinated control applications, while reducing unplanned downtime for production operations at a higher ISA level than available with conventional approaches.

The following orchestration techniques may also enable additional maintenance tasks to occur (without production downtime) for systems where system redundancy is designed into the automation configuration. These techniques enable increased interoperability for where control strategies execute among vendor hardware where platform agnostic virtualization and containerization is leveraged. These techniques also leverage current, historical and simulation results to optimize workload placement for operational technology environments for real-time operations. Further, these techniques may leverage predictions of future orchestration events to pre-plan workload placement.

In an example, a distributed resource pool is defined as a combination of compute, storage, memory across networked computing assets with the addition of function block scheduling frequency, before and after processing assignments, latency tolerance for the purpose of executing application control strategies. For instance, a control strategy (or application), may be defined by a physically distributed, coordinated set of building blocks with very strict time, block-to-block scheduling, and run-time requirements for execution. The orchestration of these building blocks in time is coordinated with respect to the order of execution, processing latency and full execution cycle of all building blocks that make up the overall application control strategy.

Figure 7:
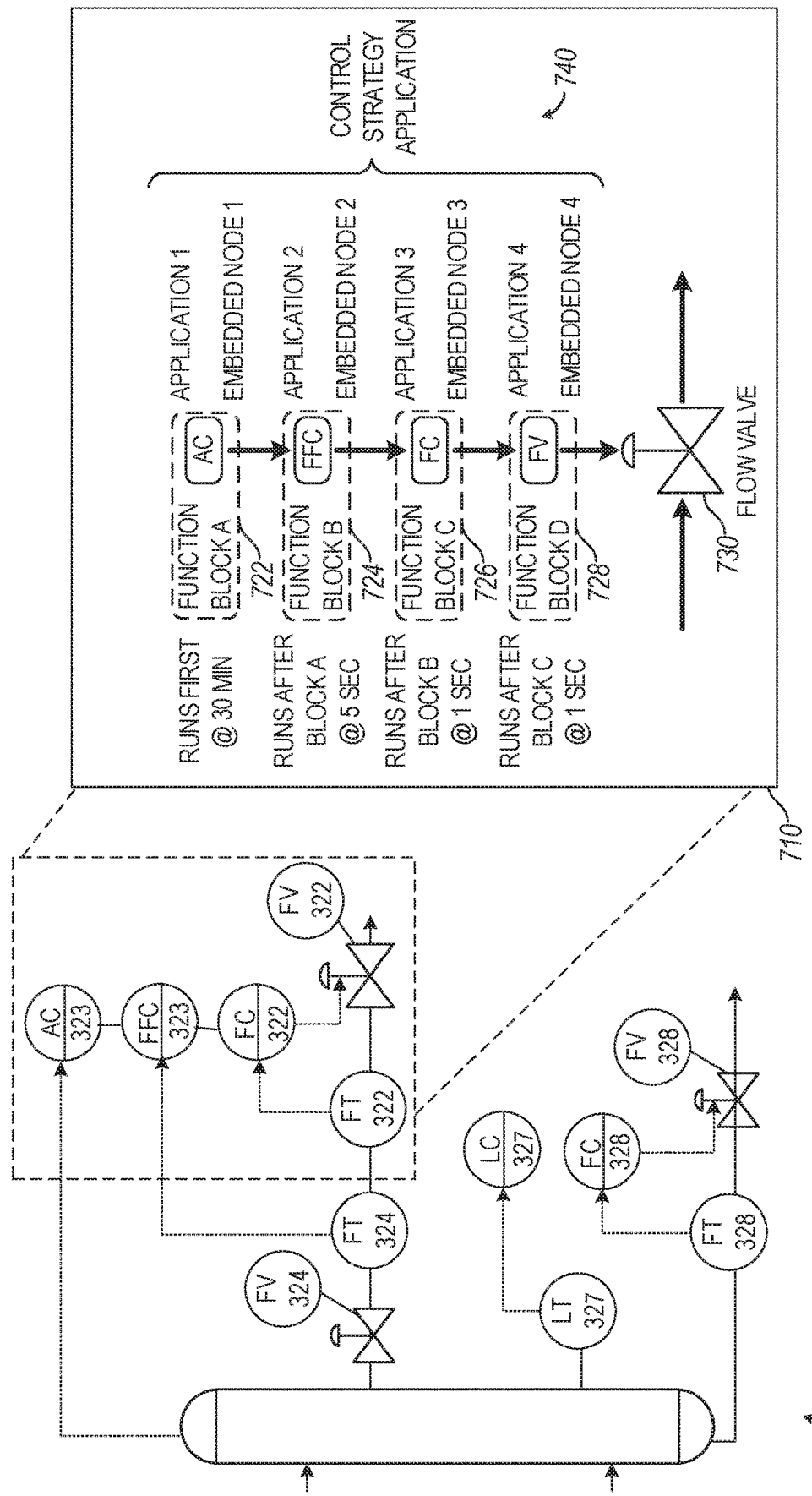
FIG. 7 illustrates an orchestration arrangement of a cascade control application based on distributed system building blocks, according to an example.

FIG. 7 illustrates an orchestration arrangement of an example cascade control application 740 based on configuration of distributed system building blocks 710. Specifically, this figure depicts an example set of building blocks 705 based on the IEC61499 function block standard. The application shown in FIG. 7 demonstrates a common layering strategy that is applied in modern distributed control systems. For this example, a subset of the total application blocks (blocks 710) are shown for illustrative purposes; however, all of the application blocks shown may be included as dependencies for a specific implementation.

For the control application 740 example shown in FIG. 7, function blocks A, B, C, and D (722, 724, 726, 728) are configured in a cascade control design for a control subsystem. Each generic building block (an independent Function Block or Application), executes a specified algorithm as part of a distributed control strategy, for control of an output (flow valve 730). In this example, control function block outputs are sent to the next function block as an input value. When a specific block is taken offline or "sheds" due to some system anomaly, links to the dependent building blocks may be replaced by the orchestrator, or handed back over to the operator for manual control.

For cascade strategies to work, the application cycle time, application runtime, application input/output signal dependency, and application process sequencing of each block of the control loop must be maintained. When these links are lost in production, much less efficient operations ensues and represents a major inherent loss at an industry level. The definition of an extended orchestrator rule set with the present techniques may address each of these resource concerns.

The layering of capability within an extended orchestrator rule set enables the addition of more advanced algorithms that directly impact production cost, improve product quality and process efficiency while protecting worker safety through a loose coupling set of design principles that enables individual applications to go off-line and degrade to lower levels of control to protect the overall operation. Without this layering of the application control, new solutions would be difficult to implement and operations would be more prone to accidents. Further, orchestration of these application assets at a control strategy level, further improves overall uptime and system performance, which directly contributes to manufacturing and process operations.

Conventional IT orchestration strategies generally would provide the ability to move individual application assets (function blocks) around a system in a dynamic manner; however, in the present example, coordination of the distributed function block applications is orchestrated across all function blocks that define a specific control strategy. The collective function block links and associated state information is maintained to orchestrate these building blocks across systems resources to keep the application on-line and avoid shedding to more basic safe control states.

Figure 8:
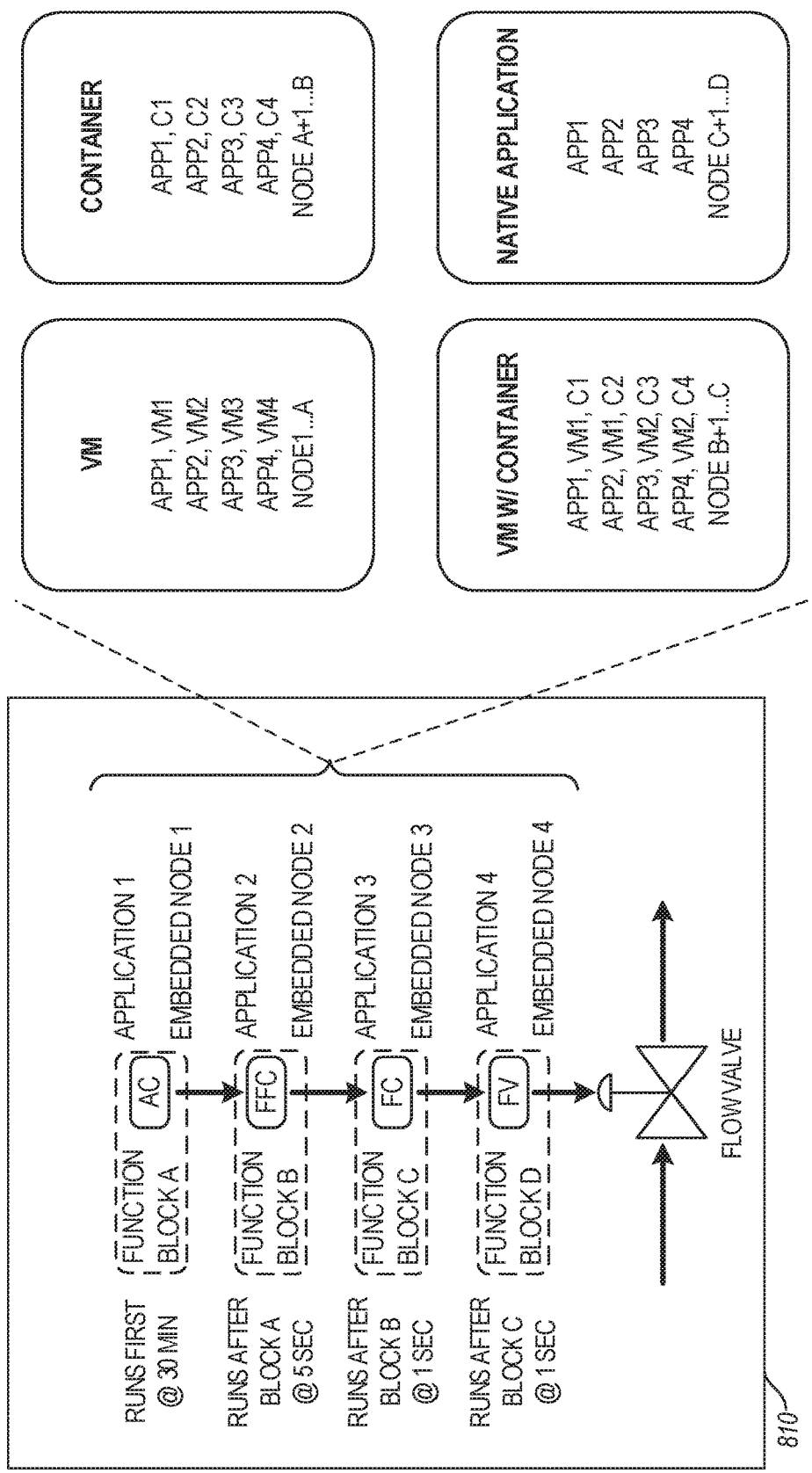
FIG. 8 illustrates an application distribution mapping for a control strategy of an orchestration scenario, according to an example.

FIG. 8 depicts an example application distribution mapping for a control strategy of an orchestration scenario that includes four applications, where application redundancy is depicted in designs 820 for native, virtual machine, container, and container in a virtual machine deployments. As illustrated, the orchestration of application assets may encompass different deployment options, or a mix of deployment options, to consider for dynamic allocation of resources, subject to various compute, storage, memory, and application constraints.

Note that for the case shown in FIG. 8, the defined applications in the orchestration scenario 810 (applications 1 to 4) are specified to run at different frequencies. In this example, the cycle and runtime dependencies are major factors in orchestration decisions at runtime. Specifically, in the depicted example, Application 1 may be orchestrated within a 30 minute window and preserve the control strategy execution; Application 2 may be orchestrated within a 5 second window and preserve the control strategy execution; Applications 3 and 4 may be orchestrated within a 1 second window and preserve the control strategy execution. If an execution window is missed for orchestration, the application links are broken, and the control strategy degrades to a SAFE state until Operations closes the loop again.

Figure 9:
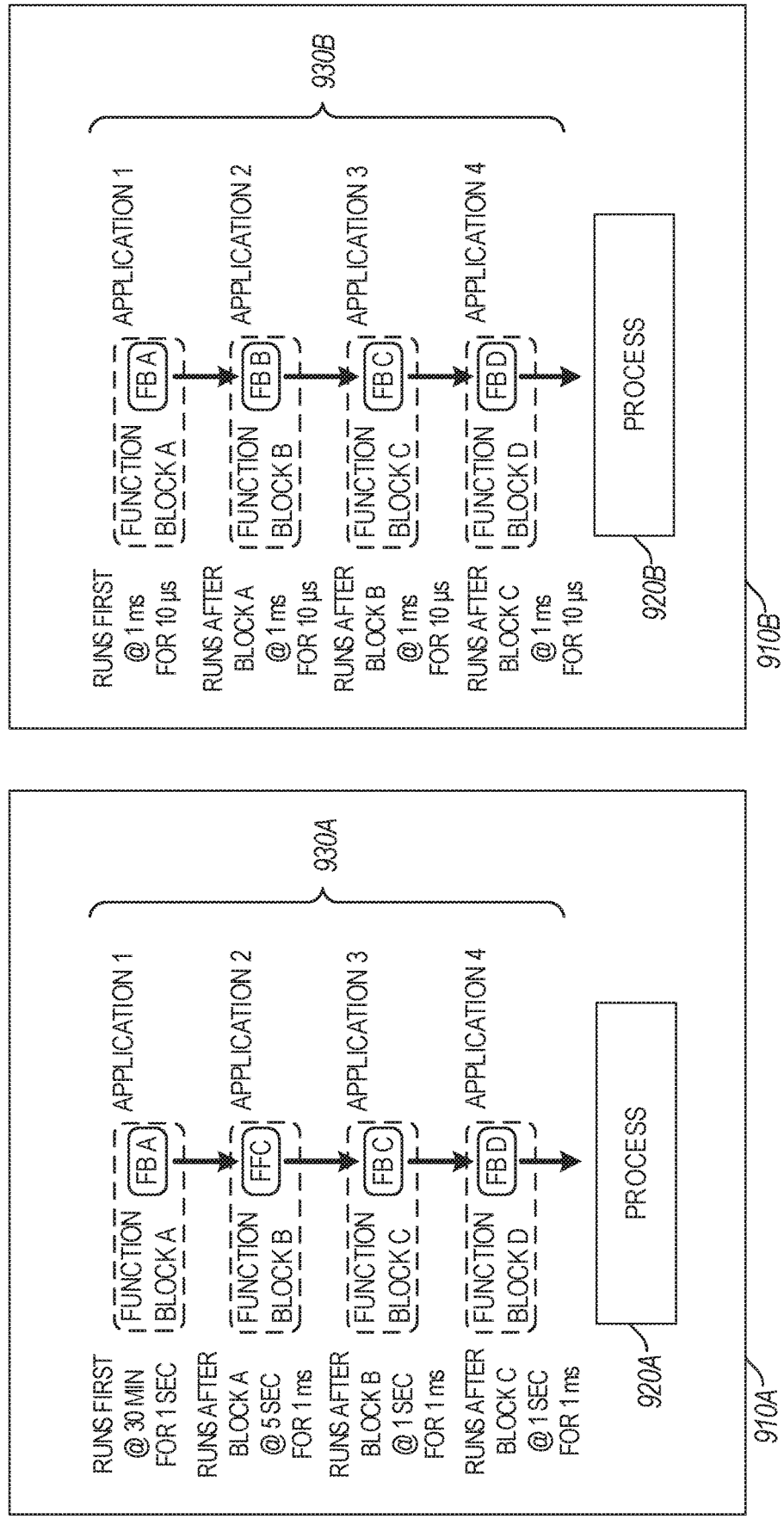
FIG. 9 illustrates orchestration scenarios adapted for handling function block application timing dependency, according to an example.

FIG. 9 illustrates example orchestration scenarios 910A, 910B adapted for handling a function block application timing dependency. As shown, application cycle, runtime dependencies, and current state play an important role in addition to more standard resource metrics in defining where an application may be deployed to maintain operations error-free. For example, a control strategy executing with relatively slow cycle time and frequency could be run in a device with lower compute resources and does not need to be co-located with the other dependent application blocks of the control strategy. In contrast, applications that need to execute at a very fast cycle time and frequency may all need to be co-located on the same device for the control strategy to run error-free.

In the example of FIG. 9, orchestration scenario 910A shows a scenario where applications 1-4 (application deployment 930A) may be distributed across independent nodes of the system to conduct process 920A. In contrast, orchestration scenario 910B shows a scenario where applications 1-4 (application deployment 930B) may not be distributed across independent nodes of the system, due to cycle and runtime limitations. Rather, applications 1-4 must be orchestrated together for any orchestration event, to successfully conduct process 920B.

Figure 10:
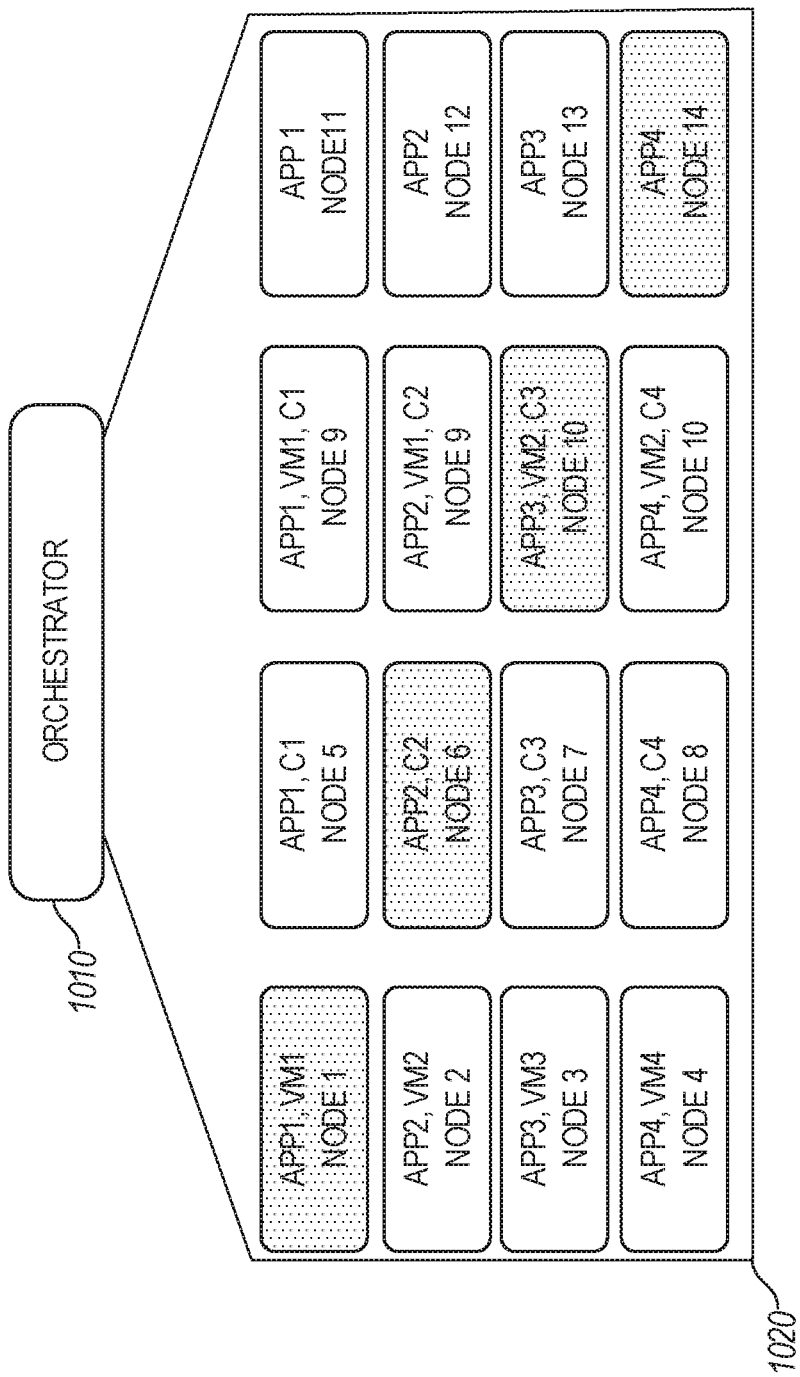
FIG. 10 illustrates an orchestration asset deployment for applications under the control of an orchestrator, according to an example.

FIG. 10 depicts an example orchestration asset deployment, showing various deployments of orchestration assets (applications 1020) under the control of an orchestrator 1010. Specifically, this example illustrates one potential dynamic application outcome based on the available system resources. As depicted, the examples cover VM, Container, VM+Container, and Native node deployment. In the example of FIG. 10, nodes 1, 6, 10, and 14 are active, demonstrating how different applications within the same orchestration may operate in different system deployment types.

Self-Descriptive Orchestration Components

Figure 11:
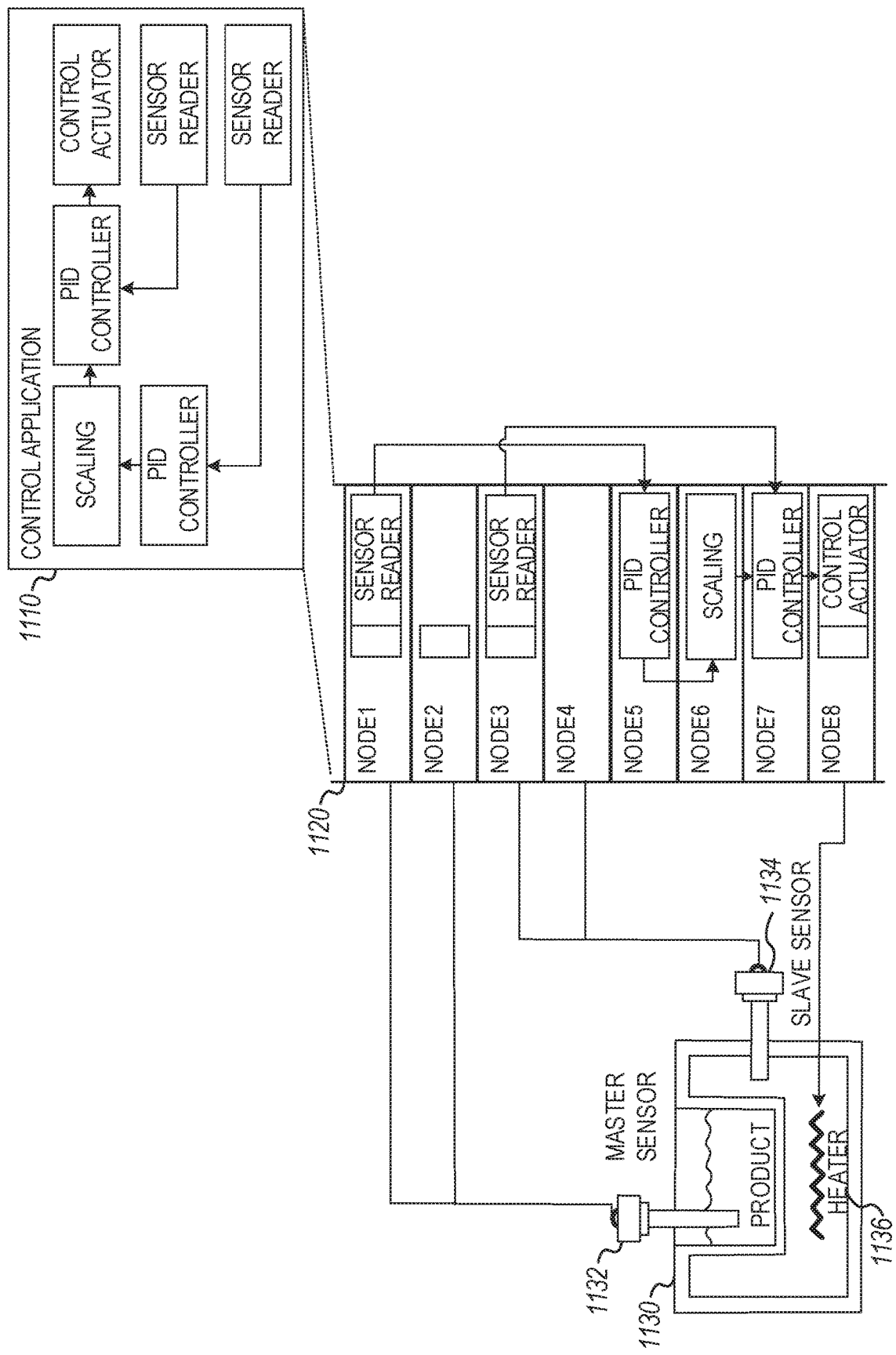
FIG. 11 illustrates an industrial control application scenario, according to an example.

In the development of an industrial solution, an engineer may design a solution as a graph of modules that may be deployed into an IoT system. FIG. 11 illustrates an example industrial control application scenario, which specifically depicts the problem of maintaining the temperature of a tank of water 1130 by heating a surrounding oil jacket with a heater 1136. The temperature of the water and the temperature of the oil are monitored by respective sensors 1132, 1134 to control the process. A set of compute nodes 1120 may be available upon which the software modules may be deployed, some of which may be connected to the physical sensors and actuators in the system.

In this example, a control engineer might design a control system application 1110 to perform functional operations, such as to control the temperature as a cascade control loop made up of a graph of software modules that may be deployed on the available compute nodes. A sensor module may read data from the master sensor 1132, which reads the value from a sensor in the water. This value is fed to the input of a PID (Proportional Integral Derivative) controller module (e.g., a controller with one or more proportional, integral, or derivative control elements), which attempts to meet a specific set point. The output of this PID controller is fed into a Scaling module, whose output establishes the set point of another PID controller. This second PID controller receives its input from a module that reads from the sensor in the oil (e.g., slave sensor 1134). The output of the second PID controller is sent to an actuator module that controls the heater element 1136. In an example, either PID controller may be a type of a controller incorporating proportional, integral, or derivative control (alone or in any combination), as part of any number of functional operations.

To properly deploy such a configuration, a control engineer describes the control application, as well as the functionality and operations within the control application. The following approach discusses a technique for defining a configuration of a language in which to describe the control system application. The following approach further discusses the use of self-describing modules upon which a control system application may be implemented; and an orchestrator that may utilize the language and the self-describing modules to deploy a working solution onto the compute nodes.

The following approaches specifically enable the use of self-configuring and self-describing modules, for an enhanced implementation of orchestration in the SDIS environments discussed herein. Self-describing modules, as discussed herein, allow better understanding of which platform resources are needed to deploy and makes orchestration easier by clarifying the requirements or constraints. Self-describing modules provide a separation of the self-description of modules, from the self-description of the end-to-end application. Self-describing modules also provide the ability to express multiple alternative implementations of a given software module and the ability to make tradeoffs between implementations. Such approaches may be implemented in an architecture for automatically evaluating tradeoffs between alternative implementations of modules and applications, thus helping a user to orchestrate an optimized application on IA (instruction architecture, e.g., x86, ARM) devices.

Figure 12:
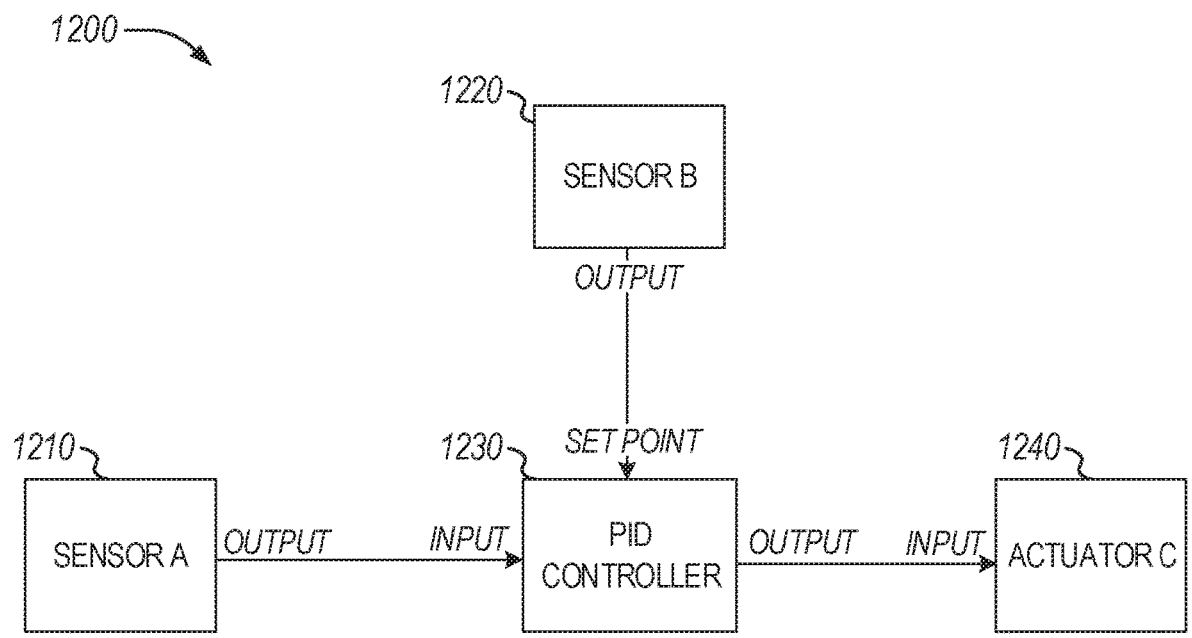
FIG. 12 illustrates an overview of a control application as represented by a control application graph, according to an example.
Figure 13:
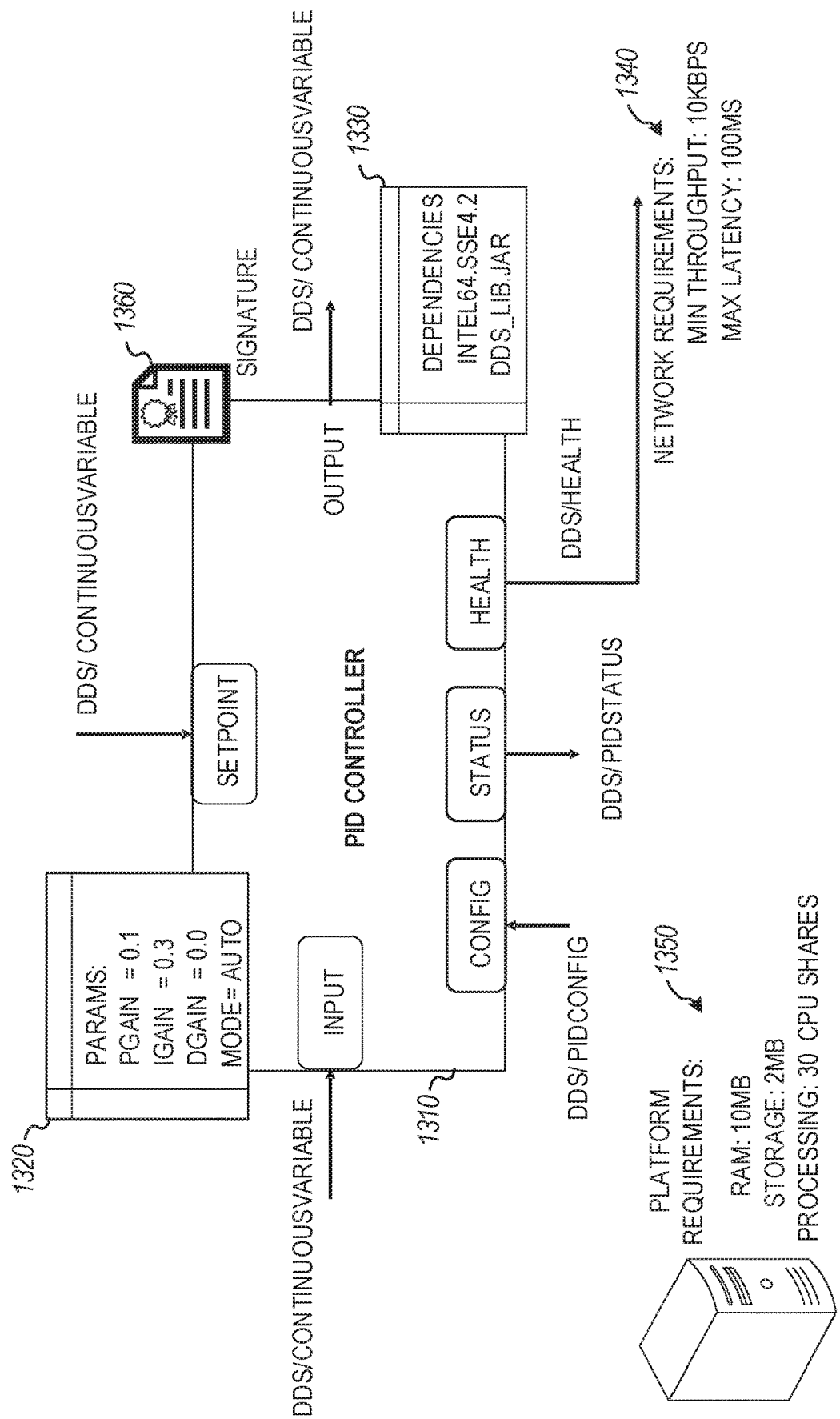
FIG. 13 illustrates a self-descriptive software module definition for implementation of a control application, according to an example.

In the following examples, a module is a component of an application that an orchestrator deploys. A module has a module manifest that describes its input and outputs, requirements and other things (as shown in FIG. 13 and referenced in the example of Table 1). An application is made up a collection of modules with inputs and outputs connected together. An application is described using an application specification (as shown in FIG. 12 and referenced in the example of Table 2). In an example, this application specification is created by a user to define the end to end application. The application specification provides an input to the orchestrator, along with any applicable module manifests. The application specification also may be used to specify the modules, their interconnections, and any additional requirements that must be met in deploying those modules. Accordingly, the use of the module manifest and the application specification in this manner can achieve and implement the functional operations of the end to end application.

The notion of defining an end-to-end application for application deployment is attempted in many settings; however, prior approaches for orchestration are focused on IT considerations and do not provide a flexible approach for use in industrial systems. Such approaches do not look at an end-to-end application encompassing everything from edge devices to the cloud deployments. Further, prior orchestration systems have not allowed a user to express alternative implementations for a given software module, or provided a means for users to evaluate or express tradeoffs between alternative implementations. The following self-describing modules and self-describing language enable better understanding of which platform resources are needed to deploy, and thus makes orchestration easier and more accurate by clarifying appropriate requirements or constraints.

In an example, a SDIS implementation may be extended to provide a language in which the control system application is described, in addition to self-describing modules upon which the control system application may be implemented. From these two elements, an orchestrator may deploy a working solution onto respective compute nodes and resources. The techniques described herein thus provide mechanisms for (1) building self-descriptions for orchestratable modules to separate an end-to-end application from the individual modules, (2) allowing a system to dynamically select between alternative implementations of modules to deploy, and (3) allowing a system to reason about which alternatives are best in different situations.

FIG. 12 depicts an overview of a control application as represented by an example control application graph 1200, represented at the level of sensors and actuators. As shown, the control application is defined by a control engineer as a graph of software modules in which the outputs of each module (e.g., outputs from Sensor A 1210, and Sensor B 1220) are connected to the inputs of other modules (e.g., inputs into Actuator C 1240, and PID controller 1230). The control engineer may also specify other factors, such as starting values for module parameters. The control engineer may find these software modules in a software library or request that custom modules be implemented by an IT department. In an example, this graph may be defined through use of a graphical user interface, or other visual-based representation. For instance, the example control application graph 1200 may be defined by the control engineer to reflect inputs, outputs, and controllers of an industrial system. The example control application graph 1200 may reflect connections of a physical system, and be used to accomplish the various functional operations (and real-world changes, measurements, and effects) of the control application.

FIG. 13 depicts an example software module definition for implementation of a self-descriptive control application, such as the control system module (a PID controller 1310) depicted in FIG. 12. In an example, the code for this software module is written with several assumptions, including that the module does not know what node it will be deployed on, and the module may communicate with neighboring modules via a set of named interfaces. Interfaces may be directional to allow for connection-oriented protocols (which often have a client and server endpoint), which are often established in a directional manner, but do not necessarily refer to the direction of data flow (which could flow in either or both directions).

In a further example, the code for this module has requirements (e.g., network requirements 1340) for the channel over which it will communicate with neighboring modules (bandwidth, latency, jitter, etc.). However, the module does not know what modules it will be communicating with or what node those modules will be deployed to. The module does not know the communication parameters for its communication endpoint or the other communication endpoint. The module may require a certain amount/kind of processing resources, memory resources, and storage resources, and may require other hardware and software dependencies (libraries, instruction sets, chipsets, security co-processors, FPGAs, etc.). Further, the module may allow a set of named starting parameters (e.g., parameters 1320) to be specified.

To make this code self-descriptive, a module developer may create a module manifest for use with the software module, with the module manifest being used to identify and describe the key characteristics of the control environment for execution of the software module. In an example, the characteristics may include features such as: (a) communication interfaces (of the PID controller 1310), including a name of each interface, type (client, server, pub/sub), protocol (dds, opc-ua, http), or QoS requirements, if any; (b) parameters and default starting values (e.g., control parameters 1320); (c) platform requirements (e.g., instruction set, OS, RAM, storage, processing) (e.g., requirements 1350); (d) dependencies (e.g., libraries, hardware, input signals, etc.) (e.g., dependencies 1330); (e) deployment requirements (security, isolation, privacy, orchestration style); or (f) a signature (e.g., signature 1360) of the code module.

An example Module Manifest for the control system application and the module executed in FIG. 13 may be represented by the following definition:

TABLE 1

```
{
    "Name": "PID Controller",
    "SchemaVersion": "0.1",
    "Version": "0.1",
    "Description": "An example PID Control Module",
    "OrchestrationClientApiVersion": "0.1",
    "ModuleType": "Software",
    "Runtime": "java",
    "RuntimeOptions": {
        "Isolation": "true",
        "Jar": "local/ PIDController.jar",
        "Class": "Example.PIDController ",
        "Artifact": "http://repo/PIDController.jar",
        "ArtifactOptions": {
            "checksum":
"1CDAE234F132D52EAB354325DF235234A53AB24523453245E2345-
324543ABD2C"
        }
    },
    "Constraints": {
        "Software": "DDSLibrary"
    },
    "Parameters": {
        "pGain": "0.1",
        "iGain": "0.3",
        "dGain": "0.0",
        "mode": "AUTO"
    },
    "Resources": {
        "CPU": 30,
        "MemoryMB": 10,
        "StorageMB": 2
    },
    "Endpoints": [
        {
            "Name": "input",
            "Endtype": "pubsub",
            "DataType": "DDS/ContinuousVariable"
        },
        {
            "Name": "setpoint",
```

TABLE 1-continued

```
            "Endtype": "pubsub",
            "DataType": "DDS/ContinuousVariable "
        },
        {
            "Name": "output",
            "Endtype": "pubsub",
            "DataType": "DDS/ContinuousVariable "
        }
    ]
}
```

In a further example, a control engineer may utilize a library of one or more software modules to create or define a control system application. For instance, a graphical user interface (GUI) may be used to design a graph of the control system application (e.g., similar to the control application graph depicted in FIG. 12). The GUI may utilize the module manifest to indicate the details of each code module and illustrate how the respective code modules may be connected to each other. Further, a user may utilize drag and drop and other graphical indication methods to select appropriate modules and connect and configure them to design a graph similar to the control application graph depicted in FIG. 12.

The results of this information, compiled into an application specification for a control system application, may be encoded into an application specification format resembling the following example:

TABLE 2

```
{
    "Name": "PID Control Loop",
    "SchemaVersion": "0.1",
    "Version": "0.1",
    "Description": "An example PID Control Loop",
    "Type": "persistent",
    "Modules": [
        {
            "Name": "Sensor A",
            "Module": "Sensor Reader",
            "checksum": "325DF23524A53A
                BD2C1CDAE234F132D52EAB3543B24523453245E234
                5324543A "
            "Constraints": {
                "WireID": "Temp1TankA"
            },
            "Resources": {
            },
            "Parameters": {
                "sensitivity": "0.2",
                "frequency": "0.2"
            },
            "Endpoints": [
                {
                    "Name": "output",
                    "Link": "inbound",
                    "Type": "DDS/ContinuousVariable"
                }
            ]
        },
        {
            "Name": "Sensor B",
            "Module": "Sensor Reader",
            "checksum": "325DF23524A53A
                BD2C1CDAE234F132D52EAB3543B24523453245E234
                5324543A"
            "Constraints": {
                "WireID": "Temp2TankA"
            },
            "Resources": {
            },
            "Parameters": {
                "sensitivity": "0.2",
```

TABLE 2-continued

```
                "frequency": "1"
            },
            "Endpoints": [
                {
                    "Name": "output",
                    "Link": "setpoint",
                    "Type": "DDS/ContinuousVariable"
                }
            ]
        },
        {
            "Name": "My PID Controller",
            "Module": "PID Controller",
            "checksum":
                "1CDAE234F132D52EAB354325DF235234A53AB2452
                3453245E2345324543ABD2C"
            "Constraints": {
            },
            "Resources": {
            },
            "Parameters": {
                "pGain": "0.2",
                "iGain": "0.2",
                "dGain": "0.1",
                "mode": "AUTO"
            },
            "Endpoints": [
                {
                    "Name": "input",
                    "Link": "inbound",
                    "Type": "DDS/ContinuousVariable"
                },
                {
                    "Name": "output",
                    "Link": "outbound",
                    "Type": "DDS/ContinuousVariable"
                },
                {
                    "Name": "setpoint",
                    "Link": "setpoint",
                    "Type": "DDS/ContinuousVariable"
                }
            ]
        },
        {
            "Name": "Actuator C",
            "Module": "Actuator",
            "checksum":
                "B423E423513366BBA2354325DF235234A53AB24523
                453245E2345324543ABD00"
            "Constraints": {
                "WireID": "Heater1TankA"
            },
            "Resources": {
            },
            "Parameters": {
                "sensitivity": "0.2",
                "frequency": "0.2"
            },
            "Endpoints": [
                {
                    "Name": "input",
                    "Link": "outbound",
                    "Type": "DDS/ContinuousVariable"
                }
            ]
        }
    ],
    "Links": [
        {
            "Name": "inbound"
        },
        {
            "Name": "outbound",
            "AssignedChannel": {
                "Name": "PIDControlOutput"
            }
        }
        {
            "Name": "setpoint"
```

TABLE 2-continued

```
        }
    ]
}
```

An application specification defined in this manner allows a control engineer to: select a set of modules to use, specify values for parameters beyond any default values, specify any additional constraints or resources beyond those specified by the module itself, and specify the manner in which the modules will be linked together. In addition, the application specification may assign specific parameters to links, such as assigning a topic name to a publish/subscribe channel, or assigning a port number to a server endpoint (making a communication endpoint accessible from outside of the application).

In an example, an application specification may also specify alternative implementations for the same functionality in an application (e.g., with each version of the functionality implemented by a different module). Consider for example, two versions of a module that implement the same functionality for two different hardware architectures. A module writer could specify these alternatives in a Module Manifest, such as indicated in the following example:

TABLE 3

```
"Implementations": [
    {
        "Runtime": "raw",
        "RuntimeOptions": {
            "Isolation": "true",
            "Package": "local/ PIDControllerr",
            "Executable": "Example.PIDController ",
            "Artifact": "http://repo/ARM/PIDController",
            "ArtifactOptions": {
                "checksum":
"1CDAE234F132D52EA4A245E2345324543ABD2C"
            }
        },
        "Constraints": {
            "Software": "DDSLibrary",
            "Architecture": "ARM"
        },
    },
    {
        "Runtime": "raw",
        "RuntimeOptions": {
            "Isolation": "true",
            "Package": "local/ PIDControllerr",
            "Executable": "Example.PIDController ",
            "Artifact": "http://repo/x86/PIDController",
            "ArtifactOptions": {
                "checksum":
"1CDAE234F132D52EA4A245E2345324543ABD2C"
            }
        },
        "Constraints": {
            "Software": "DDSLibrary",
            "Architecture": "x86"
        },
    }
]
```

In another example, a control engineer could specify these alternatives in an Application Specification as follows:

TABLE 4

```
"Modules": [
    {
        "Name": "Sensor A",
        "Implementations": [
```

TABLE 4-continued

```
            {
                "Module": "x86 PID Controller",
                "checksum": "325DF23524A53A
BD2C1CDAE234F132D52E2345324543A "
                "Constraints": {
                    "Architecture": "x86"
                }
            },
            {
                "Module": "ARM PID Controller",
                "checksum": "325DF23524A53A
BD2C1CDAE234F132D52E2345324543A "
                "Constraints": {
                    "Architecture": "ARM"
                }
            },
        ]
    }
]
```

In this example, the orchestrator may deploy on nodes of either of these two architectures (x86 or ARM), meeting either of these two constraints, by picking the appropriate software module implementation.

The use of self-descriptive module characterizations may be applied to other kinds or types of resources. For example, such self-descriptive characterizations may be applied in cases where an algorithm could be implemented on a general-purpose CPU, a GPU, or an FPGA. In this case, scoring may also be provided in the app or module specification to indicate which module is preferred. The scoring may be both algorithm-specific and data/application-specific and thus requires some knowledge on behalf of the developer or control engineer. Further, the use of scoring may enable a control engineer to optimize a selected control application by leveraging software modules that have been optimized for specific IA hardware platforms (e.g. FPGA or neural network processor (NNP)), as available.

The use of self-descriptive module characterizations may be further generalized to consider more general resources. For example, a first version of an algorithm that is optimized for memory resources while a second version of the algorithm may be optimized for storage resources. In this scenario, the first version has small memory resource requirements and larger storage requirements, whereas the second version has large memory resource requirements and small storage requirements. The orchestrator may choose a module based on the resources available on the available set of nodes. In addition, scoring may help determine which module is preferred, when other factors are not constrained.

The use of self-descriptive characterizations may also be applied in the case of node affinity. For example, a case in which Module A is to be deployed on Node A with preference level N, while Module B is to be deployed on Node B with preference level M. If N indicates higher preference than M, then the system will attempt to deploy Module A to Node A if it is available, and Module B to node B otherwise.

One of the challenges with self-descriptive characterizations, however, is that a control engineer may not actually know which version of a given software module most effectively performs a certain application function, or even what criteria may be used with the software module to produce the best end-to-end results. The control engineer may only observe objective results (e.g., what solution "seems the most responsive."). With many combinations of software modules, criteria, and options, a framework may be used for testing which combinations of system modules and alternative implementations are effective.

Figure 14:
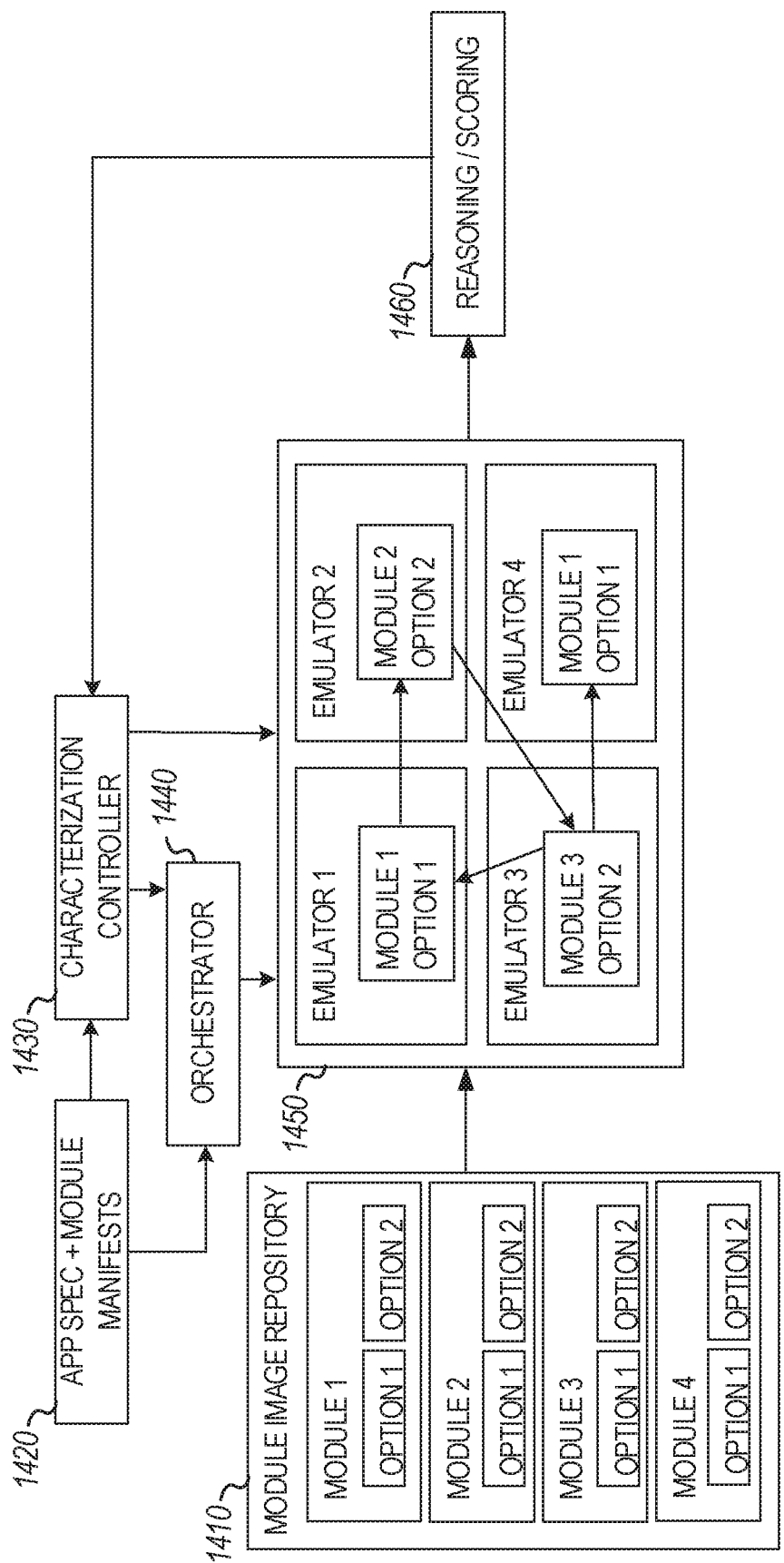
FIG. 14 illustrates an architecture for automatic evaluation of software module alternative implementations, according to an example.

FIG. 14 depicts an architecture for automatic evaluation of software module alternative implementations. Specifically, the architecture of FIG. 14 provides a framework for emulating various combinations of modules from an application specification and characterizing the result. Various data from a user's application specification and module manifests 1420 are provided to the system. The system may have access to all of the module images, stored in a module image repository 1410. There may be several alternative implementations of each module.

In an example, a series of experiments are executed and evaluated on various combinations of these implementations. The experiments may be controlled by a characterization controller 1430, which would ensure that the various combinations are executed. The experiments would work with an orchestrator 1440, which is responsible for deploying the modules as specified in the application specification and module manifests 1420 onto a set of emulators 1450. The emulators 1450 simulate the hardware as defined by a given alternative specified in the application specification or module manifest 1420 (e.g., a particular FPGA or a CPU with a certain amount of available memory). The orchestrator 1440 will deploy the app, interconnect the components, and run the app. Then the system will automatically score the system, based on some criteria (e.g., end-to-end latency) with scoring 1460, or the user will score the app based on subjective criteria ("feels snappy"). Finally, the system will reason about the various combinations, and determine the best combinations to use, such as by utilizing a decision tree-based approach.

Figure 15:
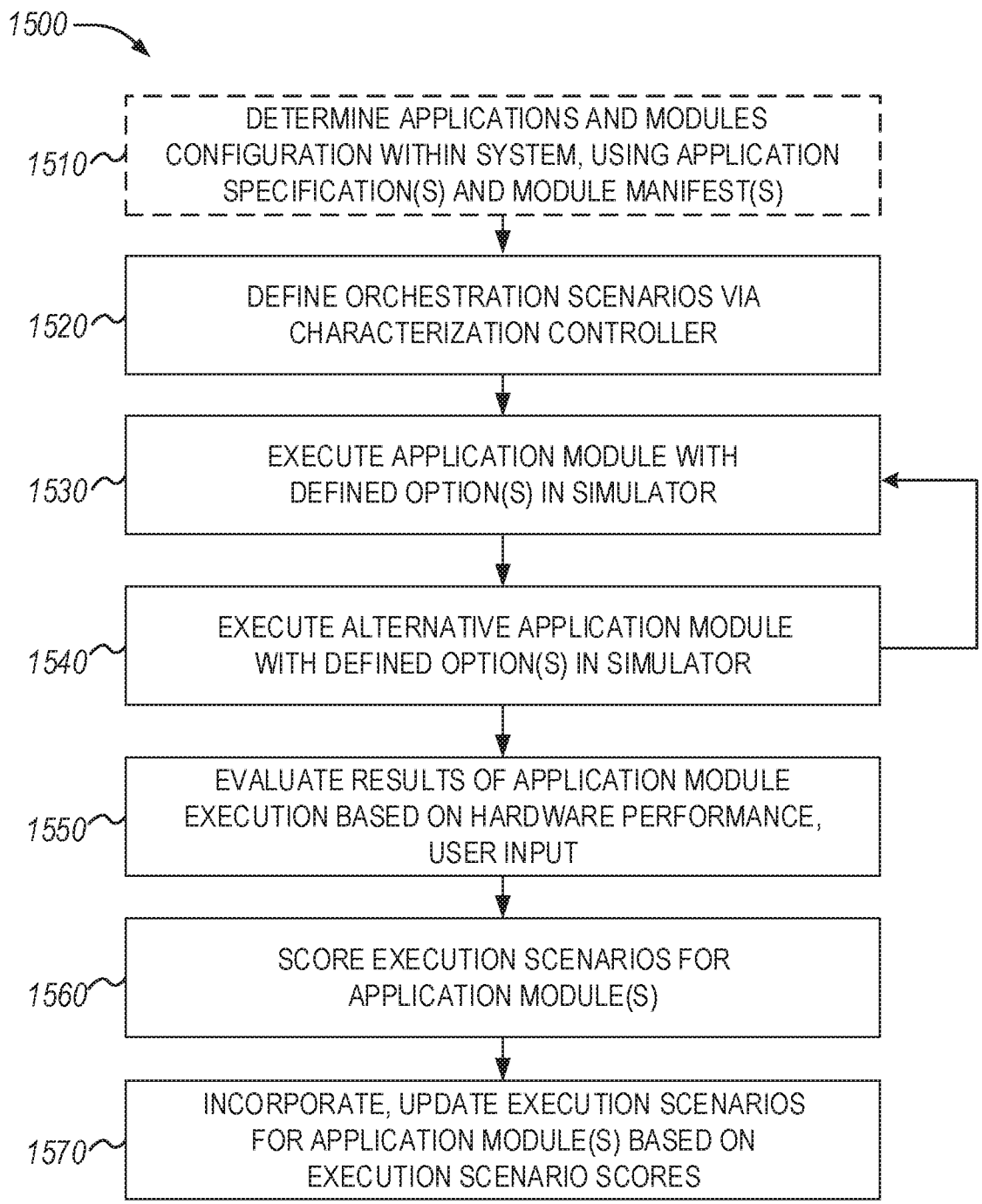
FIG. 15 illustrates a flowchart of a method for evaluating alternative implementations of software modules, according to an example.

FIG. 15 illustrates a flowchart 1500 of an example method for evaluating alternative implementations of software modules, further to the example depicted in FIG. 14. In the flowchart 1500, an optional precondition includes operations to determine the configuration of applications and modules as operational within a system, using application specification and module manifest information (operation 1510). This precondition may be performed as a one-time event or on a repeated basis.

The operations of flowchart 1500 continue with the definition and execution of respective orchestration scenarios via a characterization controller (operation 1520), which is used to execute an application module with one or more defined options in a simulator (e.g., an emulator configured according to specific hardware settings) (operation 1530). With the simulator, various modules and various module options may be executed, including the use of alternative application modules with one or more defined options in the simulator or another simulator configuration (operation 1540). The execution of alternative application modules may repeat for a plurality of the various software modules and a plurality of options.

The operations of flowchart 1500 continue with the evaluation of the results of the application module execution (operation 1550), based on defined performance metrics or criteria. The execution scenarios for the one or more application modules are then scored (operation 1560), ranked, or further evaluated, with automated or human-influenced scoring processes. Based on the scores, various execution scenarios of the application modules may be incorporated or updated (operation 1570).

Figure 16:
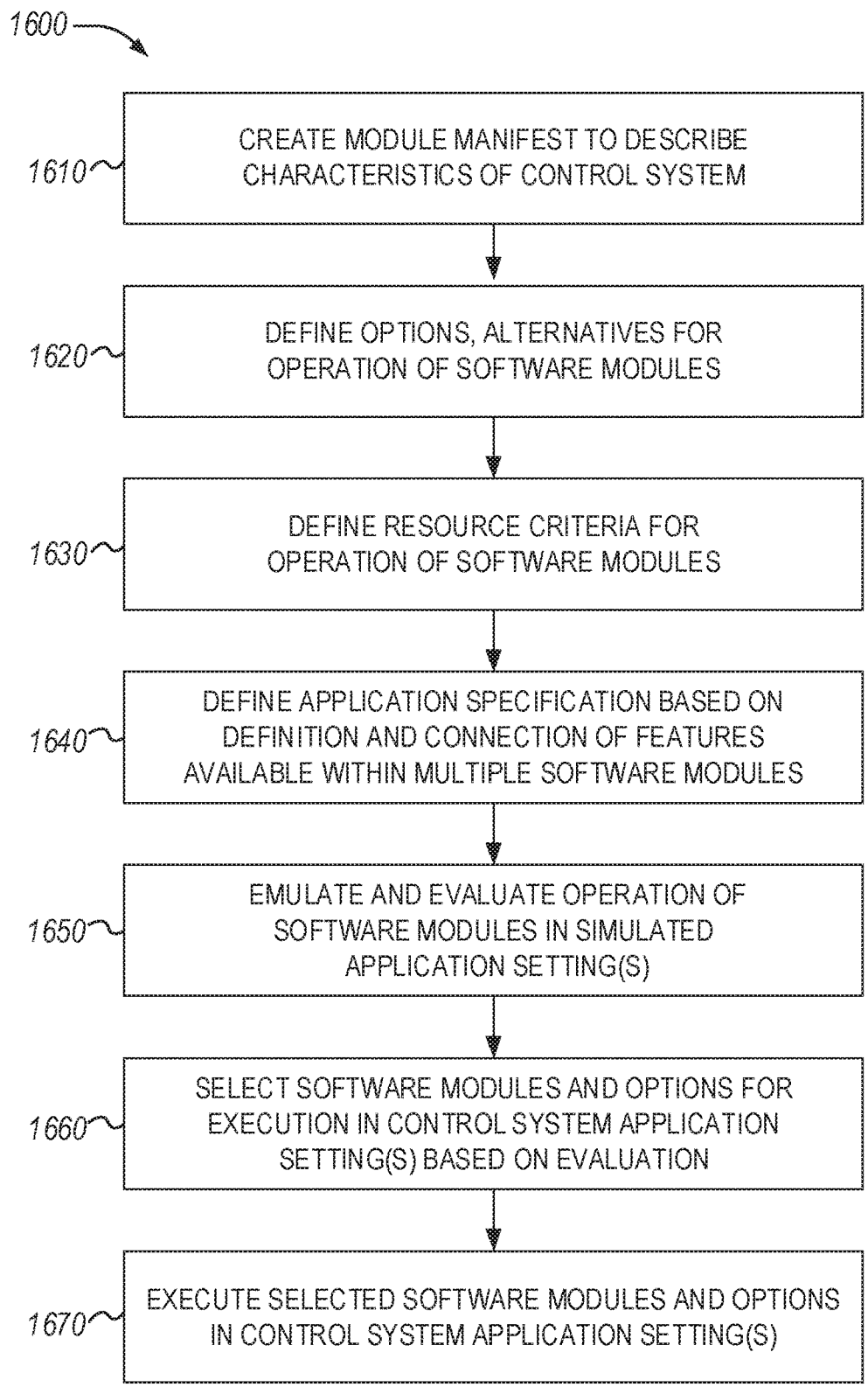
FIG. 16 illustrates a flowchart of a method for implementing self-descriptive orchestratable software modules, according to an example.

FIG. 16 illustrates a flowchart 1600 of an example method for defining an application using self-descriptive orchestratable software modules. The method begins with operations that define which software modules or application capabilities are selected and utilized as part of an application orchestration. These operations include the creation of a module manifest (operation 1610), with the module manifest used to describe respective characteristics for an orchestrated execution of modules of a control system application (e.g., an industrial control application in an SDIS). Further module definition operations also include defining of respective options and alternatives for operation of the various software modules (operation 1620), and the defining of resource criteria for operation of the various software modules (operation 1630). The operations also include the definition of a specification for the application (operation 1640), based on a definition of the respective software modules, and the connection requirements and conditions for features available within the respective software modules. Such definitions may include the various operations discussed above with reference to FIGS. 12 to 14.

The flowchart 1600 continues with the emulation and evaluation of various software modules, such as in one or more simulated application setting(s) (operation 1650) as discussed above with reference to FIG. 15. The output of the emulation may include priorities or other attributes for various implementations of a module. From this evaluation, specific combinations of software modules and options (priorities, and other attributes) for execution of such software modules may be selected (operation 1660), and these combinations may be deployed in orchestrated application settings (operation 1670). Such priorities and options may be used to inform the orchestration process, when combined with the constraints and properties of the physical system.

Figure 17:
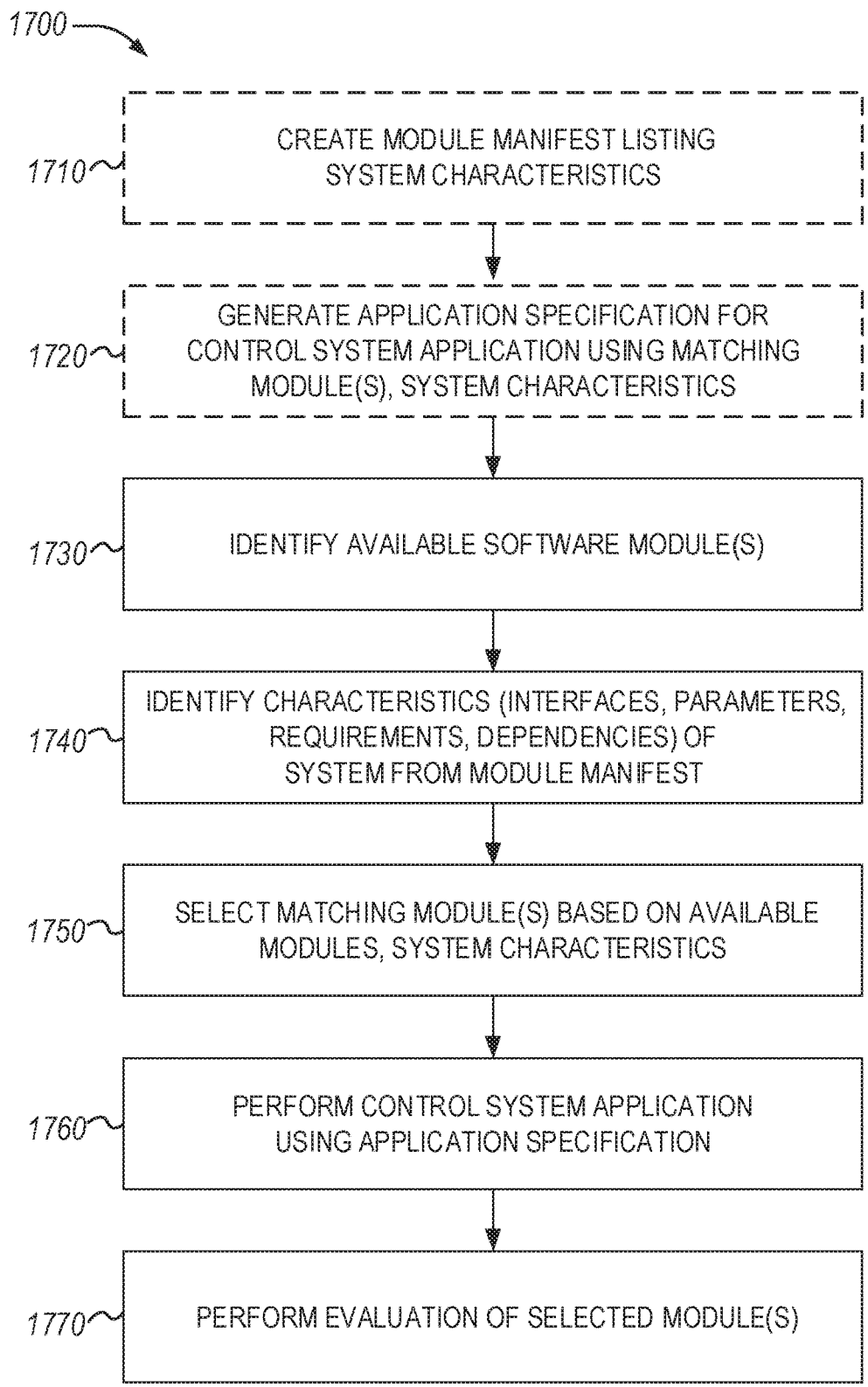
FIG. 17 illustrates a flowchart of a method for using self-descriptive orchestratable software modules in a SDIS system implementation, according to an example.

FIG. 17 illustrates a flowchart 1700 of an example method for using self-descriptive orchestratable software modules in a SDIS system implementation. In an example, the operations of the flowchart 1700 are performed by an orchestration device, for an orchestration device (an orchestrator) that is operably coupled to a plurality of execution devices in the control system environment to execute software modules. With this configuration, the execution of the selected software module via at least one execution devices effects functional operation of one or more control devices in the control system environment. Additionally, the orchestration device (the orchestrator) may coordinate the execution of the selected software module with an orchestration control strategy within the control system environment.

The flowchart 1700 begins at 1710 with an optional precondition to create module manifests and an application specification that lists required system characteristics. The operation 1710 may be performed manually or via automated/computer-assisted features. This module manifest is used by the following process to define an environment for software modules to perform a control system application.

The flowchart 1700 also continues at 1720 with an optional precondition to generate an application specification for the control system application, which includes matching module information and system characteristics (including parameters, values, and the like, for execution). For instance, the application specification for the control system application may define values for control parameters of the selected software module, including indicating relevant connections or relationships between software modules or functions.

The flowchart 1700 continues at 1730 to identify available software modules, and at 1740 to identify characteristics of the control system or control system environment from the module manifest. In an example, operational aspects of available software modules that can perform particular functional operations in the control system environment are identified. The operational characteristics of the system that are identified in the module manifest may relate to relate to one or more of: communication interfaces, starting parameters, platform requirements, dependencies, deployment requirements, or a signature.

The flowchart 1700 continues at 1750 with operations that select one or more matching software modules based on the available software modules and the system characteristics. For instance, this selection may be based on the matching of operational aspects of the available software modules with the identified operational characteristics of the system that are indicated in the module manifest.

The flowchart 1700 concludes at 1760 with operations that perform the control system application, including the execution of relevant software modules, according to the values and characteristics of the application specification. Finally, the flowchart 1700 includes operations at 1770 which allow the evaluation of execution (or simulated execution) of the relevant software modules, which allows further adjustment and feedback for the manifest or application specification. For instance, the evaluation may include evaluating the execution of the selected software module in the control system environment using at least two different hardware architectures; and performing an efficiency measurement of operations executed with the at least two different hardware architectures. Other types of execution characteristics or deployments may also be evaluated.

In various examples, the control system application may be displayed and modified with use of a visual representation displayed in a graphical user interface. For instance, the visual representation may be used to establish relationships of one or more inputs or outputs to the control system application, including for inputs or outputs involving the use of one or more sensor, actuator, or controller.

IoT Devices and Networks

The techniques described above may be implemented in connection with a variety of device deployments, including in those of any number of IoT networks and topologies. Accordingly, it will be understood that various embodiments of the present techniques may involve the coordination of edge devices, the fog and intermediary devices, and cloud entities among heterogeneous and homogeneous networks. Some of the example topologies and arrangements of such networks are provided in the following paragraphs.

Figure 18:
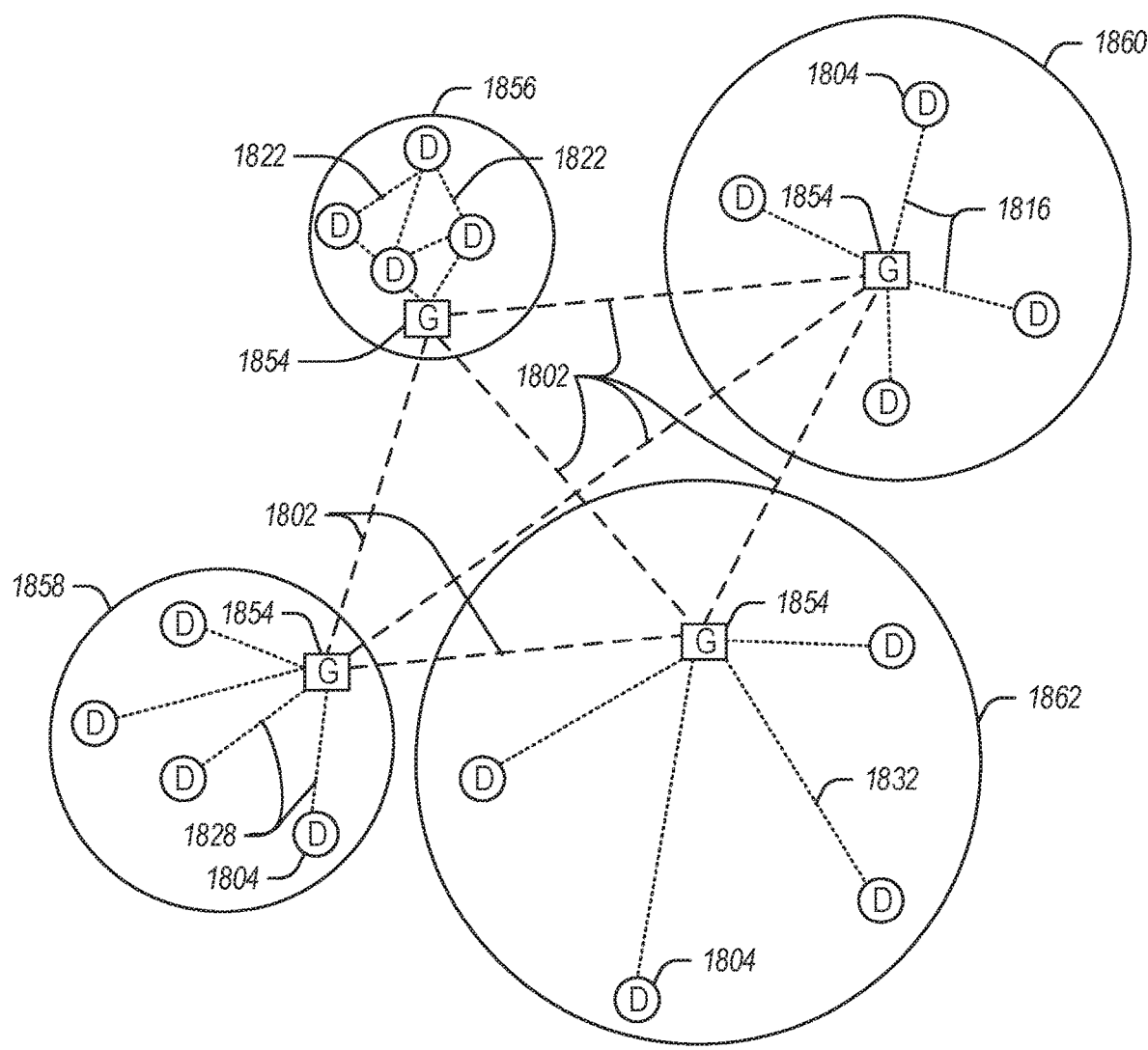
FIG. 18 illustrates a domain topology for respective internet-of-things (IoT) networks coupled through links to respective gateways, according to an example.

FIG. 18 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in the system examples discussed above, present a number of new challenges in a heterogeneous network of connectivity comprising a combination of wired and wireless technologies.

FIG. 18 specifically provides a simplified drawing of a domain topology that may be used for a number of internet-of-things (IoT) networks comprising IoT devices 1804, with the IoT networks 1856, 1858, 1860, 1862, coupled through backbone links 1802 to respective gateways 1854. For example, a number of IoT devices 1804 may communicate with a gateway 1854, and with each other through the gateway 1854. To simplify the drawing, not every IoT device 1804, or communications link (e.g., link 1816, 1822, 1828, or 1832) is labeled. The backbone links 1802 may include any number of wired or wireless technologies, including optical networks, and may be part of a local area network (LAN), a wide area network (WAN), or the Internet. Additionally, such communication links facilitate optical signal paths among both IoT devices 1804 and gateways 1854, including the use of MUXing/deMUXing components that facilitate interconnection of the various devices.

The network topology may include any number of types of IoT networks, such as a mesh network provided with the network 1856 using Bluetooth low energy (BLE) links 1822. Other types of IoT networks that may be present include a wireless local area network (WLAN) network 1858 used to communicate with IoT devices 1804 through IEEE 802.11 (Wi-Fi®) links 1828, a cellular network 1860 used to communicate with IoT devices 1804 through an LTE/LTE-A (4G) or 5G cellular network, and a low-power wide area (LPWA) network 1862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1804, such as over the backbone links 1802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1858, for instance, may use systems that perform standards conversion to provide multi-standard connectivity, enabling IoT devices 1804 using different protocols to communicate. Further systems may provide seamless interconnectivity across a multi-standard infrastructure comprising visible Internet resources and hidden Internet resources.

Communications in the cellular network 1860, for instance, may be enhanced by systems that offload data, extend communications to more remote devices, or both. The LPWA network 1862 may include systems that perform non-Internet protocol (IP) to IP interconnections, addressing, and routing. Further, each of the IoT devices 1804 may include the appropriate transceiver for wide area communications with that device. Further, each IoT device 1804 may include other transceivers for communications using additional protocols and frequencies. This is discussed further with respect to the communication environment and hardware of an IoT processing device depicted in FIGS. 20 and 21.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 19 below.

Figure 19:
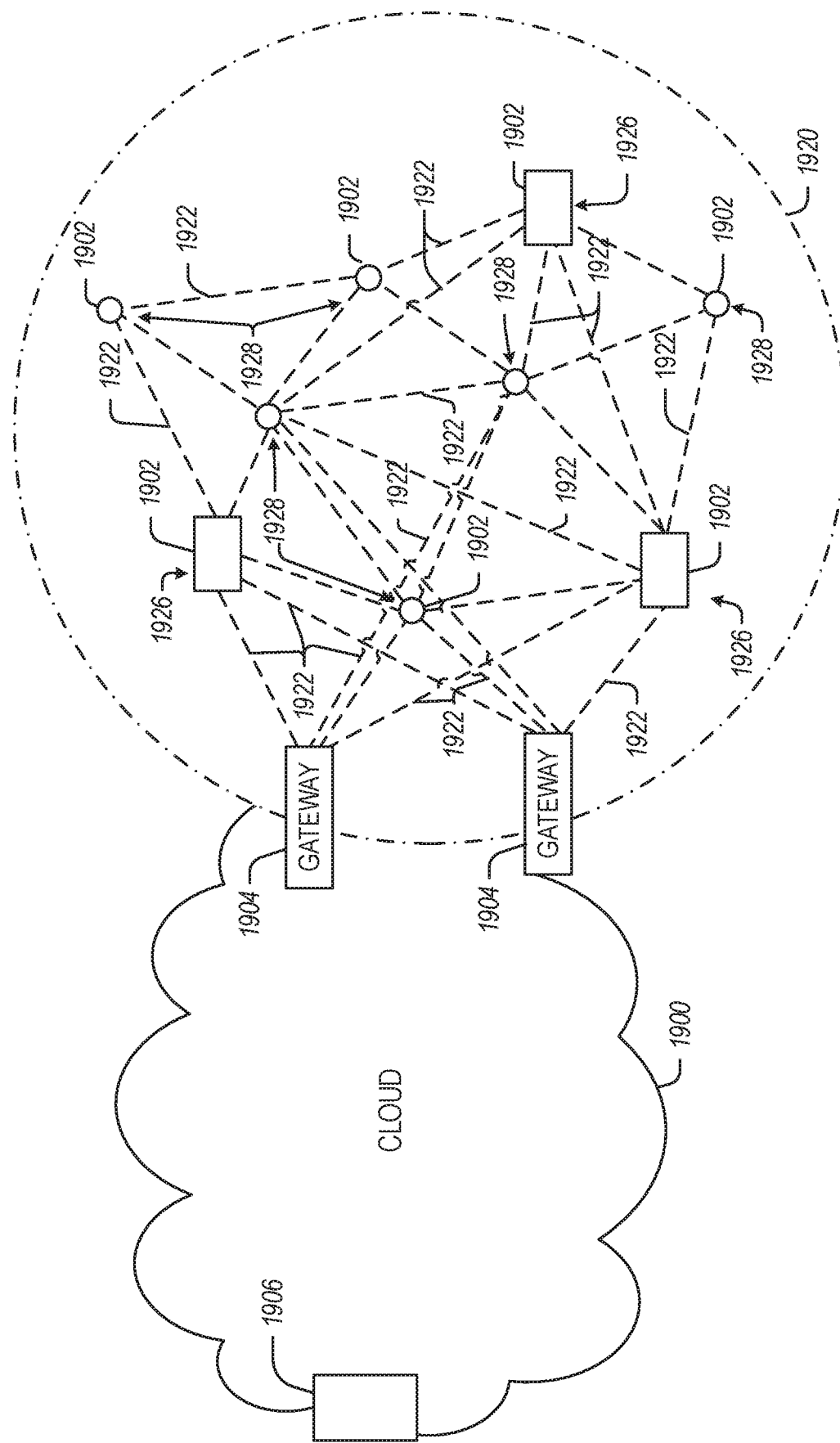
FIG. 19 illustrates a cloud computing network in communication with a mesh network of IoT devices operating as a fog device at the edge of the cloud computing network, according to an example.

FIG. 19 illustrates a cloud computing network in communication with a mesh network of IoT devices (devices 1902) operating as a fog device at the edge of the cloud computing network. The mesh network of IoT devices may be termed a fog 1920, operating at the edge of the cloud 1900. To simplify the diagram, not every IoT device 1902 is labeled.

The fog 1920 may be considered to be a massively interconnected network wherein a number of IoT devices 1902 are in communications with each other, for example, by radio links 1922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.-M.A.N.) routing protocol, or the OMA Lightweight M2M (LWM2M) protocol, among others.

Three types of IoT devices 1902 are shown in this example, gateways 1904, data aggregators 1926, and sensors 1928, although any combinations of IoT devices 1902 and functionality may be used. The gateways 1904 may be edge devices that provide communications between the cloud 1900 and the fog 1920, and may also provide the backend process function for data obtained from sensors 1928, such as motion data, flow data, temperature data, and the like. The data aggregators 1926 may collect data from any number of the sensors 1928, and perform the back end processing function for the analysis. The results, raw data, or both may be passed along to the cloud 1900 through the gateways 1904. The sensors 1928 may be full IoT devices 1902, for example, capable of both collecting data and processing the data. In some cases, the sensors 1928 may be more limited in functionality, for example, collecting the data and allowing the data aggregators 1926 or gateways 1904 to process the data.

Communications from any IoT device 1902 may be passed along a convenient path (e.g., a most convenient path) between any of the IoT devices 1902 to reach the gateways 1904. In these networks, the number of interconnections provide substantial redundancy, allowing communications to be maintained, even with the loss of a number of IoT devices 1902. Further, the use of a mesh network may allow IoT devices 1902 that are very low power or located at a distance from infrastructure to be used, as the range to connect to another IoT device 1902 may be much less than the range to connect to the gateways 1904.

The fog 1920 provided from these IoT devices 1902 may be presented to devices in the cloud 1900, such as a server 1906, as a single device located at the edge of the cloud 1900, e.g., a fog device. In this example, the alerts coming from the fog device may be sent without being identified as coming from a specific IoT device 1902 within the fog 1920. In this fashion, the fog 1920 may be considered a distributed platform that provides computing and storage resources to perform processing or data-intensive tasks such as data analytics, data aggregation, and machine-learning, among others.

In some examples, the IoT devices 1902 may be configured using an imperative programming style, e.g., with each IoT device 1902 having a specific function and communication partners. However, the IoT devices 1902 forming the fog device may be configured in a declarative programming style, allowing the IoT devices 1902 to reconfigure their operations and communications, such as to determine needed resources in response to conditions, queries, and device failures. As an example, a query from a user located at a server 1906 about the operations of a subset of equipment monitored by the IoT devices 1902 may result in the fog 1920 device selecting the IoT devices 1902, such as particular sensors 1928, needed to answer the query. The data from these sensors 1928 may then be aggregated and analyzed by any combination of the sensors 1928, data aggregators 1926, or gateways 1904, before being sent on by the fog 1920 device to the server 1906 to answer the query. In this example, IoT devices 1902 in the fog 1920 may select the sensors 1928 used based on the query, such as adding data from flow sensors or temperature sensors. Further, if some of the IoT devices 1902 are not operational, other IoT devices 1902 in the fog 1920 device may provide analogous data, if available.

In an example, the various aspects of workload orchestration and operations may be adapted to the various network topologies and approaches depicted in FIG. 19. For example, a system may establish a variety of workloads executing in the cloud 1900 in coordination with the IoT devices 1902. These workloads could be orchestrated in the cloud 1900 or fog 1920 from the edge (e.g., from IoT devices 1902), or such workloads may be orchestrated on the edge by the cloud 1900 or the fog 1920. Such concepts may also apply to gateways 1904 and data aggregators 1926 and other devices and nodes within the network topology.

In other examples, the operations and functionality described above with reference to the systems described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 20:
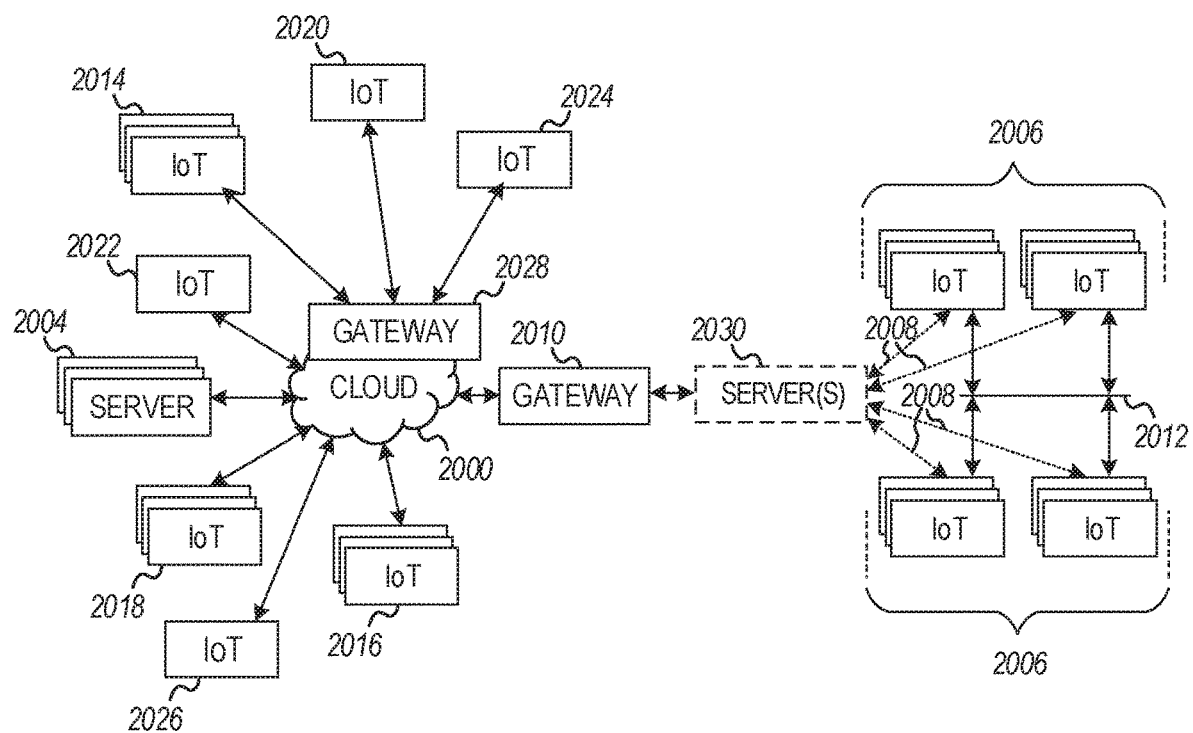
FIG. 20 illustrates a block diagram of a network illustrating communications among a number of IoT devices, according to an example.

FIG. 20 illustrates a drawing of a cloud computing network, or cloud 2000, in communication with a number of Internet of Things (IoT) devices. The cloud 2000 may represent the Internet, or may be a local area network (LAN), or a wide area network (WAN), such as a proprietary network for a company. The IoT devices may include any number of different types of devices, grouped in various combinations. For example, a traffic control group 2006 may include IoT devices along streets in a city. These IoT devices may include stoplights, traffic flow monitors, cameras, weather sensors, and the like. The traffic control group 2006, or other subgroups, may be in communication with the cloud 2000 through wired or wireless links 2008, such as LPWA links, optical links, and the like. Further, a wired or wireless sub-network 2012 may allow the IoT devices to communicate with each other, such as through a local area network, a wireless local area network, and the like. The IoT devices may use another device, such as a gateway 2010 or 2028 to communicate with remote locations such as the cloud 2000; the IoT devices may also use one or more servers 2030 to facilitate communication with the cloud 2000 or with the gateway 2010. For example, the one or more servers 2030 may operate as an intermediate network node to support a local edge cloud or fog implementation among a local area network. Further, the gateway 2028 that is depicted may operate in a cloud-to-gateway-to-many edge devices configuration, such as with the various IoT devices 2014, 2020, 2024 being constrained or dynamic to an assignment and use of resources in the cloud 2000.

Other example groups of IoT devices may include remote weather stations 2014, local information terminals 2016, alarm systems 2018, automated teller machines 2020, alarm panels 2022, or moving vehicles, such as emergency vehicles 2024 or other vehicles 2026, among many others. Each of these IoT devices may be in communication with other IoT devices, with servers 2004, with another IoT fog device or system (not shown, but depicted in FIG. 19), or a combination therein. The groups of IoT devices may be deployed in various residential, commercial, and industrial settings (including in both private or public environments).

As may be seen from FIG. 20, a large number of IoT devices may be communicating through the cloud 2000. This may allow different IoT devices to request or provide information to other devices autonomously. For example, a group of IoT devices (e.g., the traffic control group 2006) may request a current weather forecast from a group of remote weather stations 2014, which may provide the forecast without human intervention. Further, an emergency vehicle 2024 may be alerted by an automated teller machine 2020 that a burglary is in progress. As the emergency vehicle 2024 proceeds towards the automated teller machine 2020, it may access the traffic control group 2006 to request clearance to the location, for example, by lights turning red to block cross traffic at an intersection in sufficient time for the emergency vehicle 2024 to have unimpeded access to the intersection.

Clusters of IoT devices, such as the remote weather stations 2014 or the traffic control group 2006, may be equipped to communicate with other IoT devices as well as with the cloud 2000. This may allow the IoT devices to form an ad-hoc network between the devices, allowing them to function as a single device, which may be termed a fog device or system (e.g., as described above with reference to FIG. 19).

Figure 21:
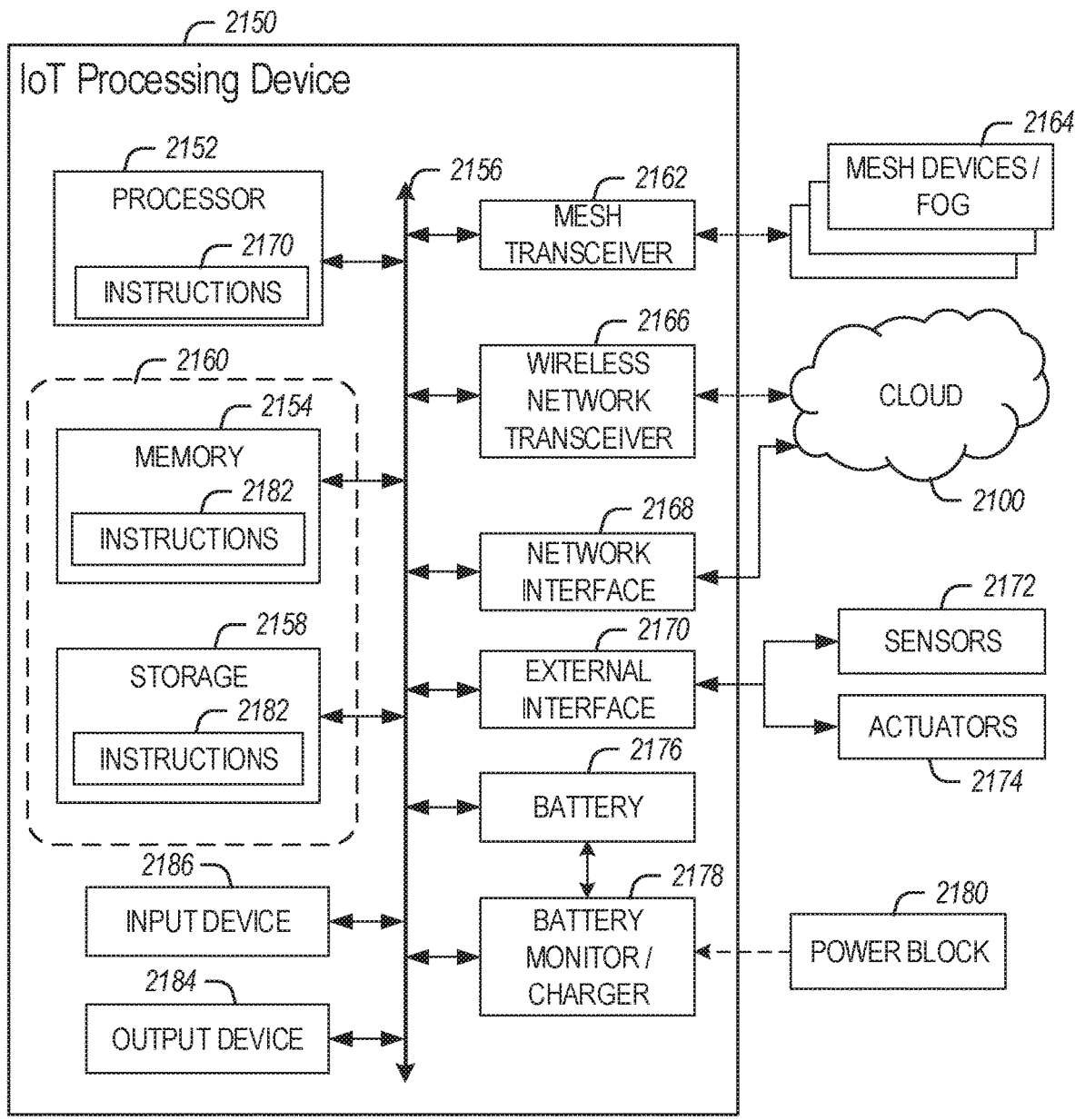
FIG. 21 illustrates a block diagram for an example IoT processing system architecture upon which any one or more of the techniques (e.g., operations, processes, methods, and methodologies) discussed herein may be performed.

FIG. 21 is a block diagram of an example of components that may be present in an IoT device 2150 for implementing the techniques described herein. The IoT device 2150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2150, or as components otherwise incorporated within a chassis of a larger system. Additionally, the block diagram of FIG. 21 is intended to depict a high-level view of components of the IoT device 2150. However, some of the components shown may be omitted, additional components may be present, and different arrangement of the components shown may occur in other implementations.

The IoT device 2150 may include a processor 2152, which may be a microprocessor, a multi-core processor, a multithreaded processor, an ultra-low voltage processor, an embedded processor, or other known processing element. The processor 2152 may be a part of a system on a chip (SoC) in which the processor 2152 and other components are formed into a single integrated circuit, or a single package, such as the Edison™ or Galileo™ SoC boards from Intel. As an example, the processor 2152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2152 may communicate with a system memory 2154 over an interconnect 2156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2158 may also couple to the processor 2152 via the interconnect 2156. In an example the storage 2158 may be implemented via a solid state disk drive (SSDD). Other devices that may be used for the storage 2158 include flash memory cards, such as SD cards, microSD cards, xD picture cards, and the like, and USB flash drives. In low power implementations, the storage 2158 may be on-die memory or registers associated with the processor 2152. However, in some examples, the storage 2158 may be implemented using a micro hard disk drive (HDD). Further, any number of new technologies may be used for the storage 2158 in addition to, or instead of, the technologies described, such resistance change memories, phase change memories, holographic memories, or chemical memories, among others.

The components may communicate over the interconnect 2156. The interconnect 2156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2156 may be a proprietary bus, for example, used in a SoC based system. Other bus systems may be included, such as an I2C interface, an SPI interface, point to point interfaces, and a power bus, among others.

The interconnect 2156 may couple the processor 2152 to a mesh transceiver 2162, for communications with other mesh devices 2164. The mesh transceiver 2162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2162 may communicate using multiple standards or radios for communications at different range. For example, the IoT device 2150 may communicate with close devices, e.g., within about 10 meters, using a local transceiver based on BLE, or another low power radio, to save power. More distant mesh devices 2164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2166 may be included to communicate with devices or services in the cloud 2100 via local or wide area network protocols. The wireless network transceiver 2166 may be a LPWA transceiver that follows the IEEE 802.15.4, or IEEE 802.15.4g standards, among others. The IoT device 2150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2162 and wireless network transceiver 2166, as described herein. For example, the radio transceivers 2162 and 2166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2162 and 2166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2168 may be included to provide a wired communication to the cloud 2100 or to other devices, such as the mesh devices 2164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2168 may be included to allow connect to a second network, for example, a NIC 2168 providing communications to the cloud over Ethernet, and a second NIC 2168 providing communications to other devices over another type of network.

The interconnect 2156 may couple the processor 2152 to an external interface 2170 that is used to connect external devices or subsystems. The external devices may include sensors 2172, such as accelerometers, level sensors, flow sensors, optical light sensors, camera sensors, temperature sensors, a global positioning system (GPS) sensors, pressure sensors, barometric pressure sensors, and the like. The external interface 2170 further may be used to connect the IoT device 2150 to actuators 2174, such as power switches, valve actuators, an audible sound generator, a visual warning device, and the like.

In some optional examples, various input/output (I/O) devices may be present within, or connected to, the IoT device 2150. For example, a display or other output device 2184 may be included to show information, such as sensor readings or actuator position. An input device 2186, such as a touch screen or keypad may be included to accept input. An output device 2184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2150.

A battery 2176 may power the IoT device 2150, although in examples in which the IoT device 2150 is mounted in a fixed location, it may have a power supply coupled to an electrical grid. The battery 2176 may be a lithium ion battery, or a metal-air battery, such as a zinc-air battery, an aluminum-air battery, a lithium-air battery, and the like.

A battery monitor/charger 2178 may be included in the IoT device 2150 to track the state of charge (SoCh) of the battery 2176. The battery monitor/charger 2178 may be used to monitor other parameters of the battery 2176 to provide failure predictions, such as the state of health (SoH) and the state of function (SoF) of the battery 2176. The battery monitor/charger 2178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2178 may communicate the information on the battery 2176 to the processor 2152 over the interconnect 2156. The battery monitor/charger 2178 may also include an analog-to-digital (ADC) convertor that allows the processor 2152 to directly monitor the voltage of the battery 2176 or the current flow from the battery 2176. The battery parameters may be used to determine actions that the IoT device 2150 may perform, such as transmission frequency, mesh network operation, sensing frequency, and the like.

A power block 2180, or other power supply coupled to a grid, may be coupled with the battery monitor/charger 2178 to charge the battery 2176. In some examples, the power block 2180 may be replaced with a wireless power receiver to obtain the power wirelessly, for example, through a loop antenna in the IoT device 2150. A wireless battery charging circuit, such as an LTC4020 chip from Linear Technologies of Milpitas, Calif., among others, may be included in the battery monitor/charger 2178. The specific charging circuits chosen depend on the size of the battery 2176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2158 may include instructions 2182 in the form of software, firmware, or hardware commands to implement the techniques described herein. Although such instructions 2182 are shown as code blocks included in the memory 2154 and the storage 2158, it may be understood that any of the code blocks may be replaced with hardwired circuits, for example, built into an application specific integrated circuit (ASIC).

In an example, the instructions 2182 provided via the memory 2154, the storage 2158, or the processor 2152 may be embodied as a non-transitory, machine readable medium 2160 including code to direct the processor 2152 to perform electronic operations in the IoT device 2150. The processor 2152 may access the non-transitory, machine readable medium 2160 over the interconnect 2156. For instance, the non-transitory, machine readable medium 2160 may be embodied by devices described for the storage 2158 of FIG. 21 or may include specific storage units such as optical disks, flash drives, or any number of other hardware devices. The non-transitory, machine readable medium 2160 may include instructions to direct the processor 2152 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising processing circuitry adapted to: identify operational aspects of available software modules, the available software modules adapted to perform functional operations in a control system environment; identify operational characteristics from a module manifest, wherein the operational characteristics define an environment for the available software modules to perform a control system application; select a software module of the available software modules, based on the identified operational aspects of the available software modules and the identified operational characteristics from the module manifest; and cause execution of the selected software module in the control system environment, wherein the execution occurs according to an application specification for the control system application.

In Example 2, the subject matter of Example 1 includes, the operational aspects of the available software modules relating to one or more of: communication interfaces, starting parameters, platform requirements, dependencies, deployment requirements, or a signature.

In Example 3, the subject matter of Examples 1-2 includes, the processing circuitry further adapted to: generate the application specification for the control system application, based on the operational characteristics, and the selected software module; wherein the application specification defines values for control parameters of the selected software module.

In Example 4, the subject matter of Example 3 includes, the application specification indicating a connection from the selected software module to a second selected software module.

In Example 5, the subject matter of Examples 1-4 includes, the processing circuitry further adapted to: evaluate the execution of the selected software module in the control system environment using at least two different hardware architectures; and perform an efficiency measurement of operations executed with the at least two different hardware architectures.

In Example 6, the subject matter of Examples 1-5 includes, the control system application and connected modules being displayed as a visual representation in a graphical user interface, wherein the visual representation is used to establish relationships of one or more inputs or outputs of modules within the control system application, wherein the inputs or outputs to the modules include use of one or more: sensor, actuator, or controller.

In Example 7, the subject matter of Examples 1-6 includes, the apparatus as an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 8, the subject matter of Example 7 includes, the processing circuitry further adapted to coordinate the execution of the selected software module with an orchestration control strategy within the control system environment.

In Example 9, the subject matter of Examples 1-8 includes, the processing circuitry further adapted to: select a plurality of software modules, the plurality of software modules including a selection of the software module; and connect the plurality of software modules to each other according to the operational characteristics.

Example 10 is a method, comprising: identifying operational aspects of available software modules, the available software modules adapted to perform functional operations in a control system environment; identifying operational characteristics from a module manifest, wherein the operational characteristics define an environment for the available software modules to perform a control system application; selecting a software module of the available software modules, based on the identified operational aspects of the available software modules and the identified operational characteristics from the module manifest; and causing execution of the selected software module in the control system environment, wherein the execution occurs according to an application specification for the control system application.

In Example 11, the subject matter of Example 10 includes, the operational aspects of the available software modules relating to one or more of: communication interfaces, starting parameters, platform requirements, dependencies, deployment requirements, or a signature.

In Example 12, the subject matter of Examples 10-11 includes, generating the control system application, using the application specification, and based on the operational characteristics, and the selected software module; wherein the application specification defines values for control parameters of the selected software module, and wherein the application specification indicates a connection from the selected software module to a second selected software module.

In Example 13, the subject matter of Examples 10-12 includes, evaluating the execution of the selected software module in the control system environment using at least two different hardware architectures; and identifying an efficiency measurement of operations executed with the at least two different hardware architectures.

In Example 14, the subject matter of Examples 10-13 includes, the control system application and respective software modules being displayed as a visual representation in a graphical user interface, wherein the visual representation is used to establish relationships of one or more inputs or outputs of the software modules within the control system application, wherein the inputs or outputs to the software modules include use of one or more sensor, actuator, or controller.

In Example 15, the subject matter of Examples 10-14 includes, the method performed by an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 16, the subject matter of Example 15 includes, coordinating the execution of the selected software module with an orchestration control strategy within the control system environment.

In Example 17, the subject matter of Examples 15-16 includes, selecting a plurality of software modules for use in the control system environment, the plurality of software modules including the selection of the software module; and connecting the plurality of software modules to each other according to the operational characteristics.

Example 18 is at least one non-transitory machine-readable storage medium including instructions, wherein the instructions, when executed by a processing circuitry of a device, cause the processing circuitry to perform operations comprising: identifying operational aspects of available software modules, the available software modules adapted to perform functional operations in a control system environment; identifying operational characteristics from a module manifest, wherein the operational characteristics define an environment for the available software modules to perform a control system application; selecting a software module of the available software modules, based on the identified operational aspects of the available software modules and the identified operational characteristics from the module manifest; and causing execution of the selected software module in the control system environment, wherein the execution occurs according to an application specification for the control system application.

In Example 19, the subject matter of Example 18 includes, the operational aspects of the available software modules relating to one or more of: communication interfaces, starting parameters, platform requirements, dependencies, deployment requirements, or a signature.

In Example 20, the subject matter of Examples 18-19 includes: generating the application specification for the control system application, based on the operational characteristics, and the selected software module; wherein the application specification defines values for control parameters of the selected software module, and wherein the application specification indicates a connection from the selected software module to a second selected software module.

In Example 21, the subject matter of Examples 18-20 includes: evaluating the execution of the selected software module in the control system environment using at least two different hardware architectures; and identifying an efficiency measurement of operations executed with the at least two different hardware architectures.

In Example 22, the subject matter of Examples 18-21 includes, the control system application and respective software modules being displayed as a visual representation in a graphical user interface, wherein the visual representation is used to establish relationships of one or more inputs or outputs of the software modules within the control system application, wherein the inputs or outputs to the software modules include use of one or more sensor, actuator, or controller.

In Example 23, the subject matter of Examples 18-22 includes, the operations performed by an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 24, the subject matter of Example 23 includes: coordinating the execution of the selected software module with an orchestration control strategy within the control system environment.

In Example 25, the subject matter of Examples 23-24 includes: selecting a plurality of software modules for use in the control system environment, the plurality of software modules including the selection of the software module; and connecting the plurality of software modules to each other according to the operational characteristics.

Example 26 is a method for operation of a software defined industrial system, comprising: establishing respective functional definitions of a software defined industrial system, the software defined industrial system to interface with a plurality of devices, wherein the plurality of devices include, respective sensors and respective actuators; and operating the software defined industrial system using a module manifest and application specification to fulfill the respective functional definitions, based on any of the operations of Examples 1 to 25.

In Example 27, the subject matter of Example 26 includes, defining and deploying self-describing control applications and software modules for the software defined industrial system, where the self-describing control applications comprise a plurality of self-descriptive orchestratable software modules.

In Example 28, the subject matter of Example 27 includes, updating a module manifest to describe characteristics of the software defined industrial system; defining an application specification based on definition and connection of features available within the orchestratable software modules; defining options and alternatives for operation of the orchestratable software modules; and executing a selection of the orchestratable software modules, based on the options and alternatives.

In Example 29, the subject matter of Example 28 includes, emulating and evaluating operation of the orchestratable software modules in a simulated application setting, wherein the selection of the orchestratable software modules is based on a result of the simulated application setting.

In Example 30, the subject matter of Example 29 includes, emulating and evaluating operation of the orchestratable software modules by: determining available application and software module configurations, using an application specification and one or more module manifests; defining a plurality of orchestration scenarios via a characterization controller; executing an application module and at least one alternative application module with defined option(s), with a simulator, to achieve the plurality of orchestration scenarios; evaluating results of execution for the application module and the at least one alternative application module based on hardware performance and user input; and generating respective scores for the results of execution for the application module and the at least one alternative application module.

In Example 31, the subject matter of Examples 29-30 includes, scenarios associated with the results of execution that are automatically incorporated for use in the application based on the respective scores.

Example 32 is at least one machine readable medium including instructions, which when executed by a computing system, cause the computing system to perform any of the operations of Examples 1-31.

Example 33 is an apparatus comprising respective means for performing any of operations of Examples 1-31.

Example 34 is a software defined industrial system, comprising respective devices and respective circuitry in the respective devices, with the respective circuitry configured to perform the operations of any of operations of Examples 1-31.

Example 35 is an apparatus, comprising circuitry configured to perform the operations of any of the operations of Examples 1-31.

In Example 36, the subject matter of Example 35 includes, the apparatus as a gateway enabling connection to adapted plurality of field devices, other device networks, or other network deployments.

In Example 37, the subject matter of Examples 35-36 includes, the apparatus as a device operably coupled to at least one sensor and at least one actuator.

In Example 38, the subject matter of Examples 35-37 includes, the apparatus as an Edge Control Node device adapted for connection to a plurality of field devices.

In Example 39, the subject matter of Examples 35-38 includes, the apparatus as an Intelligent I/O Controller device adapted for connection to a plurality of field devices.

In Example 40, the subject matter of Examples 35-39 includes, the apparatus as a Basic I/O Controller device adapted for connection to a plurality of field devices.

In Example 41, the subject matter of Examples 35-40 includes, the apparatus as a control server computing system adapted for connection to a plurality of networked systems.

In Example 42, the subject matter of Examples 35-41 includes, the apparatus as a control processing node computing system adapted for connection to a plurality of networked systems.

Example 43 is a networked system, comprising respective devices connected within a fog or cloud network topology, the respective devices comprising circuitry configured to perform the operations of any of Examples 1 to 31.

In Example 44, the subject matter of Example 43 includes, the respective devices being connected via a real-time service bus.

In Example 45, the subject matter of Examples 43-44 includes, the network topology including controller, storage, and compute functionality for a software defined industrial system via a redundant pair of hosts.

In Example 46, the subject matter of Examples 43-45 includes, the network topology including controller, storage, and compute functionalities for a software defined industrial system via separate physical hosts.

What is claimed is:

1. An apparatus, comprising processing circuitry adapted to:
   identify operational aspects of available software modules, the available software modules adapted to perform functional operations in a control system environment;
   identify operational characteristics from a module manifest, wherein the operational characteristics define an environment for the available software modules to perform a control system application;
   select a software module of the available software modules, based on the identified operational aspects of the available software modules and the identified operational characteristics from the module manifest; and
   cause execution of the selected software module in the control system environment, wherein the execution occurs according to an application specification for the control system application, wherein the application specification defines values for control parameters of the selected software module,
   wherein the apparatus is an orchestration device, wherein the orchestration device is operably coupled to a plurality of execution devices in the control system environment that execute software modules, and wherein the execution of the selected software module via at least one execution devices effects functional operation of one or more control devices in the control system environment, and wherein the processing circuitry is further adapted to coordinate the execution of the selected software module with an orchestration control strategy within the control system environment.

2. The apparatus of claim 1, wherein the operational aspects of the available software modules relate to one or more of: communication interfaces, starting parameters, platform requirements, dependencies, deployment requirements, or a signature.

3. The apparatus of claim 1, the processing circuitry further adapted to:
generate the application specification for the control system application, based on the operational characteristics, and the selected software module.

4. The apparatus of claim 3, wherein the application specification indicates a connection from the selected software module to a second selected software module.

5. The apparatus of claim 1, the processing circuitry further adapted to:
evaluate the execution of the selected software module in the control system environment using at least two different hardware architectures; and
perform an efficiency measurement of operations executed with the at least two different hardware architectures.

6. The apparatus of claim 1, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

7. The apparatus of claim 1, wherein the processing circuitry is further adapted to:
select a plurality of software modules, the plurality of software modules including a selection of the software module; and
connect the plurality of software modules to each other according to the operational characteristics.

8. A method performed by an orchestration device, comprising:
identifying operational aspects of available software modules, the available software modules adapted to perform functional operations in a control system environment;
identifying operational characteristics from a module manifest, wherein the operational characteristics define an environment for the available software modules to perform a control system application;
selecting a software module of the available software modules, based on the identified operational aspects of the available software modules and the identified operational characteristics from the module manifest; and
causing execution of the selected software module in the control system environment, wherein the execution occurs according to an application specification for the control system application, wherein the application specification defines values for control parameters of the selected software module,
wherein the orchestration device is operably coupled to a plurality of execution devices in the control system environment that execute software modules, and wherein the execution of the selected software module via at least one execution devices effects functional operation of one or more control devices in the control system environment, and wherein the method further comprises coordinating the execution of the selected software module with an orchestration control strategy within the control system environment.

9. The method of claim 8, wherein the operational aspects of the available software modules relate to one or more of: communication interfaces, starting parameters, platform requirements, dependencies, deployment requirements, or a signature.

10. The method of claim 8, further comprising:
generating the application specification for the control system application, based on the operational characteristics, and the selected software module;
wherein the application specification indicates a connection from the selected software module to a second selected software module.

11. The method of claim 8, further comprising:
evaluating the execution of the selected software module in the control system environment using at least two different hardware architectures; and
identifying an efficiency measurement of operations executed with the at least two different hardware architectures.

12. The method of claim 8, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

13. The method of claim 8, further comprising:
selecting a plurality of software modules for use in the control system environment, the plurality of software modules including the selection of the software module; and
connecting the plurality of software modules to each other according to the operational characteristics.

14. At least one non-transitory machine-readable storage medium including instructions, wherein the instructions, when executed by a processing circuitry of a device, cause the processing circuitry to perform operations comprising:
identifying operational aspects of available software modules, the available software modules adapted to perform functional operations in a control system environment;
identifying operational characteristics from a module manifest, wherein the operational characteristics define an environment for the available software modules to perform a control system application;
selecting a software module of the available software modules, based on the identified operational aspects of the available software modules and the identified operational characteristics from the module manifest; and
causing execution of the selected software module in the control system environment, wherein the execution occurs according to an application specification for the control system application, wherein the application specification defines values for control parameters of the selected software module,
wherein the operations are performed by an orchestration device, wherein the orchestration device is operably coupled to a plurality of execution devices in the control system environment that execute software modules, and wherein the execution of the selected software module via at least one execution devices effects functional operation of one or more control devices in the control system environment, the operations further comprising: coordinating the execution of the selected software module with an orchestration control strategy within the control system environment.

15. The machine-readable medium of claim 14, wherein the operational aspects of the available software modules relate to one or more of: communication interfaces, starting parameters, platform requirements, dependencies, deployment requirements, or a signature.

16. The machine-readable medium of claim 14, the operations further comprising:
generating the application specification for the control system application, based on the operational characteristics, and the selected software module;
wherein the application specification indicates a connection from the selected software module to a second selected software module.

17. The machine-readable medium of claim 14, the operations further comprising:
evaluating the execution of the selected software module in the control system environment using at least two different hardware architectures; and
identifying an efficiency measurement of operations executed with the at least two different hardware architectures.

18. The machine-readable medium of claim 14, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

19. The machine-readable medium of claim 14 the operations further comprising:
selecting a plurality of software modules for use in the control system environment, the plurality of software modules including the selection of the software module; and
connecting the plurality of software modules to each other according to the operational characteristics.

20. The apparatus of claim 1, wherein the processing circuitry is further adapted to dynamically select between alternative implementations of the selected software module, wherein each of the alternative implementations is described in the module manifest of the selected software module, and wherein the application specification specifies possible alternative implementations for a given functionality in the control system application.

21. The method of claim 8, further comprising: dynamically selecting between alternative implementations of the selected software module, wherein each of the alternative implementations is described in the module manifest of the selected software module, and wherein the application specification specifies possible alternative implementations for a given functionality in the control system application.

22. The at least one non-transitory machine-readable storage medium of claim 14, the operations further comprising dynamically selecting between alternative implementations of the selected software module, wherein each of the alternative implementations is described in the module manifest of the selected software module, and wherein the application specification specifies possible alternative implementations for a given functionality in the control system application.

* * * * *

UNITED STATES PATENT AND TRADEMARK OFFICE
CERTIFICATE OF CORRECTION

PATENT NO. : 11,637,918 B2
APPLICATION NO. : 16/147190
DATED : April 25, 2023
INVENTOR(S) : Yarvis et al.

It is certified that error appears in the above-identified patent and that said Letters Patent is hereby corrected as shown below:

In the Claims

In Column 43, Line 31, in Claim 19, after "claim 14", insert --,--

Signed and Sealed this
Thirtieth Day of July, 2024

Katherine Kelly Vidal
*Director of the United States Patent and Trademark Office*